(12) United States Patent
Kobayashi et al.

(10) Patent No.: US 11,940,327 B2
(45) Date of Patent: Mar. 26, 2024

(54) COLOR MEASURING SYSTEM AND PROGRAM

(71) Applicant: SEIKO EPSON CORPORATION, Tokyo (JP)

(72) Inventors: Ayako Kobayashi, Nagano (JP); Yuka Kobayashi, Nagano (JP); Yasuo Koyauchi, Nagano (JP); Marina Mineno, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/651,578

(22) Filed: Feb. 18, 2022

(65) Prior Publication Data
US 2022/0268630 A1    Aug. 25, 2022

(30) Foreign Application Priority Data
Feb. 22, 2021   (JP) .................... 2021-026089

(51) Int. Cl.
| | |
|---|---|
| *G01J 3/50* | (2006.01) |
| *G01J 3/02* | (2006.01) |
| *G01J 3/46* | (2006.01) |
| *H04N 1/00* | (2006.01) |

(52) U.S. Cl.
CPC .............. *G01J 3/50* (2013.01); *G01J 3/0264* (2013.01); *G01J 3/027* (2013.01); *G01J 3/0291* (2013.01); *G01J 3/46* (2013.01); *G01J 3/462* (2013.01); *G01J 3/463* (2013.01); *G01J 2003/467* (2013.01); *H04N 1/00018* (2013.01); *H04N 1/00023* (2013.01); *H04N 1/00034* (2013.01)

(58) Field of Classification Search
CPC .. G01J 3/50; G01J 3/0264; G01J 3/027; G01J 3/0291; G01J 3/46; G01J 3/462; G01J 3/463; G01J 2003/467; H04N 1/00018; H04N 1/00023; H04N 1/00034
USPC ........................................................ 356/420
See application file for complete search history.

(56) References Cited

U.S. PATENT DOCUMENTS

| | | | | |
|---|---|---|---|---|
| 5,706,083 | A | * | 1/1998 | Iida ............................ G01J 3/02 |
| | | | | 356/402 |
| 5,781,206 | A | * | 7/1998 | Edge .................... H04N 1/6036 |
| | | | | 347/172 |
| 6,014,221 | A | * | 1/2000 | Plude, Jr. .................. G01J 3/46 |
| | | | | 356/402 |

(Continued)

FOREIGN PATENT DOCUMENTS

| | | | | | |
|---|---|---|---|---|---|
| JP | 2000067217 | A | * | 3/2000 | ............... H04N 9/64 |
| JP | 2015037224 | A | * | 2/2015 | ............... H04N 1/46 |

(Continued)

*Primary Examiner* — Michelle M Iacoletti
*Assistant Examiner* — Noah J. Haney
(74) *Attorney, Agent, or Firm* — Global IP Counselors, LLP

(57) ABSTRACT

A color measuring system includes a receiving section configured to receive designation of a color group including a plurality of colors, a determining section configured to determine whether a color measured by the color measuring section and a comparison target color in the color group coincide, and a control section configured to, when it is determined that the measured color and the comparison target color coincide, automatically advance a color measuring process to a color measuring process for performing the color measurement for a next color in the color group.

14 Claims, 20 Drawing Sheets

(56) References Cited

U.S. PATENT DOCUMENTS

| | | | | |
|---|---|---|---|---|
| 7,898,704 | B2* | 3/2011 | Doi | H04N 1/6033 |
| | | | | 358/1.9 |
| 9,838,568 | B2 | 12/2017 | Hayashi et al. | |
| 10,057,549 | B2* | 8/2018 | Yu | H04N 23/51 |
| 2008/0208500 | A1* | 8/2008 | Mestha | G01J 3/463 |
| | | | | 356/402 |
| 2009/0244573 | A1* | 10/2009 | Seto | H04N 1/6033 |
| | | | | 358/1.14 |
| 2009/0296118 | A1* | 12/2009 | Tsukamoto | G01J 3/524 |
| | | | | 358/1.9 |
| 2011/0058195 | A1* | 3/2011 | Kano | H04N 1/46 |
| | | | | 358/1.9 |
| 2012/0133962 | A1* | 5/2012 | Kondo | H04N 1/6033 |
| | | | | 358/1.9 |
| 2013/0300761 | A1* | 11/2013 | Ahmed | G09G 5/02 |
| | | | | 345/595 |
| 2015/0233764 | A1* | 8/2015 | Nakatsuka | G01J 3/52 |
| | | | | 358/1.9 |
| 2016/0006904 | A1* | 1/2016 | Iwamura | H04N 1/6086 |
| | | | | 382/167 |
| 2016/0307336 | A1* | 10/2016 | Allen | G01J 3/524 |
| 2017/0102271 | A1* | 4/2017 | Tsukigi | G05B 19/401 |
| 2017/0374237 | A1* | 12/2017 | Muller | B41J 29/393 |
| 2018/0027132 | A1* | 1/2018 | Yamasaki | H04N 1/00408 |
| | | | | 358/504 |
| 2018/0052052 | A1* | 2/2018 | Tanimura | G01J 3/463 |
| 2018/0252584 | A1* | 9/2018 | Yamanoi | G01J 3/0275 |
| 2019/0019313 | A1* | 1/2019 | Xu | G06T 7/90 |
| 2021/0004995 | A1* | 1/2021 | Burg | G01J 3/50 |

FOREIGN PATENT DOCUMENTS

| | | |
|---|---|---|
| JP | 2016-166916 A | 9/2016 |
| WO | WO-2020189660 A1 * | 9/2020 |

\* cited by examiner

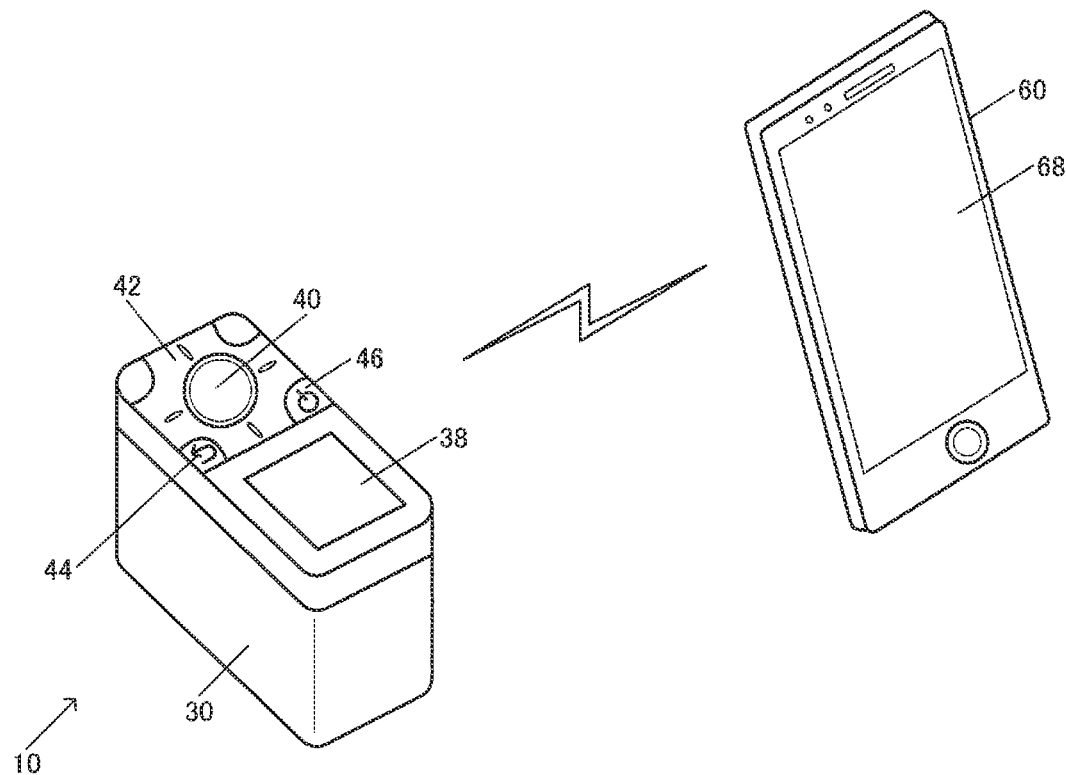
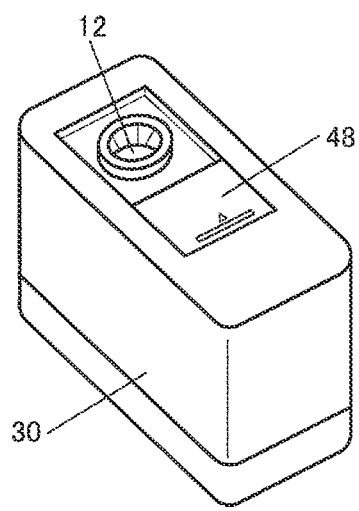

FIG. 21

| FAVORITE SETTING | |
|---|---|
| SETTING 1 | M0/D65/CIEDE 2000/△E2.0 ✓ |
| SETTING 2 | M1/D50/CIE 76/△E1.0 |
| ADD TO FAVORITE | |
| COLOR MEASUREMENT SETTING | |
| M FACTOR | M0 > |
| NUMBER OF TIMES OF COLOR MEASUREMENT | 1 > |
| COLOR CALCULATION | |
| OBSERVATION LIGHT SOURCE | D65 > |
| COLOR DIFFERENCE FORMULA | CIEDE 2000 > |
| COLOR DIFFERENCE THRESHOLD | △E 2.0 > |
| COLOR PROFILE | |
| RGB | ○○○○ > |
| CMYK | △△△△ > |
| RENDERING INTENT | PERCEPTUAL > |

COLOR MEASURING SYSTEM AND PROGRAM

The present application is based on, and claims priority from JP Application Serial Number 2021-026089, filed Feb. 22, 2021, the disclosure of which is hereby incorporated by reference herein in its entirety.

BACKGROUND

1. Technical Field

The present disclosure relates to a color measuring system, a program, and the like.

2. Related Art

There has been known a color measuring system that performs color measurement for a color. As related art of such a color measuring system, there has been known, for example, a system disclosed in JP-A-2016-166916 (Patent Literature 1). Patent Literature 1 discloses an image reading device including an image scanner that reads a patch and a spectral color meter that measures a color of the patch read by the image scanner.

The color measuring system sometimes performs color measurement for a color group including a plurality of colors. However, in the color measurement for the color group, complicated operation is necessary and work is troublesome and unclear for a user.

SUMMARY

An aspect of the present disclosure relates to a color measuring system including: a color measuring section configured to perform color measurement; a receiving section configured to receive designation of a color group including a plurality of colors; a determining section configured to determine whether a color measured by the color measuring section and a comparison target color in the color group coincide; and a control section configured to, when it is determined that the measured color and the comparison target color coincide, automatically advance a color measuring process to a next color measuring process for performing the color measurement for a next color in the color group.

An aspect of the present disclosure relates to a non-transitory computer-readable storage medium storing a program for causing a computer to function as: a receiving section configured to receive designation of a color group including a plurality of colors; a determining section configured to determine whether a measured color and a comparison target color in the color group coincide; and a control section configured to, when it is determined that the measured color and the comparison target color coincide, automatically advance a color measuring process to a next color measuring process for performing color measurement for a next color in the color group.

BRIEF DESCRIPTION OF THE DRAWINGS

FIG. 2 is an example of an exterior view of a colorimeter and a terminal device that realize the color measuring system.

FIG. 3 is an example of an exterior view of the colorimeter.

FIG. 21 is an explanatory diagram about various settings in the color measuring system.

DESCRIPTION OF EXEMPLARY EMBODIMENTS

An embodiment explained below does not unduly limit content described in the claims. Not all of components explained in this embodiment are always essential constituent elements.

1. Color Measuring System

Figure 1:
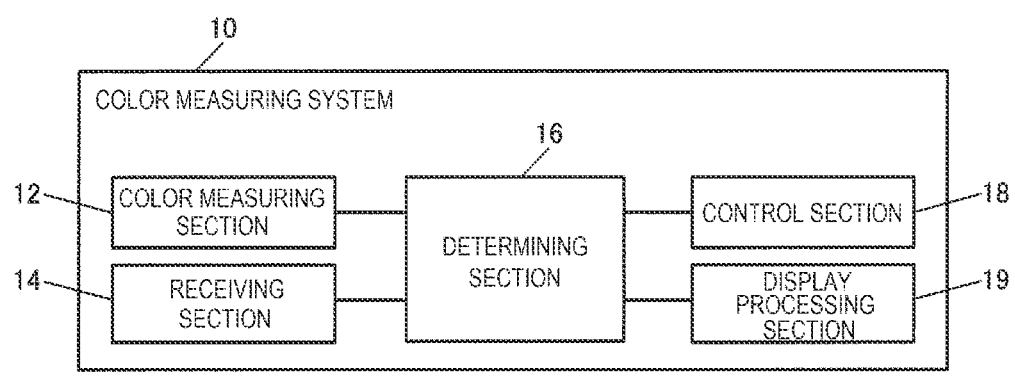
FIG. 1 is a configuration example of a color measuring system.

FIG. 1 is a diagram showing a configuration example of a color measuring system 10 in this embodiment. The color measuring system 10 includes a color measuring section 12, a receiving section 14, a determining section 16, and a control section 18. The color measuring system 10 can include a display processing section 19.

The color measuring section 12 performs color measurement. For example, the color measuring section 12 performs the color measurement for a target color, for example, printed on a printing medium and outputs a color measurement value, which is a color measurement result. The color measuring section 12 can be realized by a color measurement sensor or the like. For example, a spectral sensor can be used as the color measurement sensor. For example, a spectral sensor by MEMS (Micro Electro Mechanical Systems) capable of performing collective production in a wafer-level process can be used as the color measurement sensor. The spectral sensor is, for example, a sensor that measures a reflective spectrum. Specifically, the spectral sensor can be realized by a light source realized by an LED or the like, an optical filter that receives an input of reflected light on a measurement surface for light from the light source and performs selection and switching of a wavelength, a light receiving device that measures a light amount of the reflected light having passed through the optical filter, and the like. As the optical filter, for example, an etalon, which is a wavelength filter using multiple interference of two opposed reflection surfaces can be used. By performing, with the spectral sensor, the measurement of the reflective spectrum for measuring light amounts of the reflected light at wavelengths of the reflected light, the color measurement for the target color is realized. The color measurement sensor that realizes the color measuring section 12 is not limited to such a spectral sensor. The color measurement sensor may be realized by, for example, an image sensor. As the color measuring section 12, a color measuring section that not only measures reflected light but also measures transmitted light may be adopted.

The receiving section 14 performs processing for receiving designation of a color group including a plurality of colors. For example, when the color measurement for a plurality of colors is necessary in a measurement target, the receiving section 14 receives designation of a color group including the plurality of colors. Examples of the color group include a color group in spot color measurement and a color group in line color measurement. A plurality of colors are, for example, printed on a measurement target for which inspection or the like is performed. It is checked in the inspection whether these colors coincide with desired colors. At that time, the receiving section 14 receives designation of a color group including target colors of the color measurement. The designated color group is correlated as a color measurement target of the user and saved and registered in a not-shown storing section of the color measuring system 10. The color measuring system 10 measures the measurement target plurality of colors using the color measuring section 12 and compares the measurement target plurality of colors with the colors included in the designated color group and determines whether the measurement target plurality of colors and the colors included in the designated color group coincide.

The determining section 16 performs processing for determining whether a color measured by the color measuring section 12 and a comparison target color in a color group coincide. For example, about first to n-th colors (n is an integer equal to or larger than 2), the determining section 16 compares a measured color and a comparison target color and determines whether the measured color and the comparison target color coincide. The measured color and the comparison target color coinciding means that a permissive condition for coincidence of colors is satisfied. The permissive condition can be variously set. For example, when a color difference between the measured color and the comparison target color is smaller than a given value, the determining section 16 determines that the measured color and the comparison target color coincide. The permissive condition may be another condition about the color difference or a condition about an environmental light source or may be a condition for each color component or a condition of a reflective spectrum. A combination of these conditions may be the permissive condition.

When it is determined that the measured color and the comparison target color coincide, the control section 18 performs processing for automatically advancing a color measuring process to a next color measuring process for performing the color measurement for the next color in the color group. The color measuring process in this embodiment means a process until a colorimeter 30 shown in FIGS. 2 to 4 explained below performs the color measurement and determines whether a measured color and a comparison target color coincide. Automatically advancing the color measuring process to the next color measuring process for performing the color measurement for the next color means advancing the color measuring process to a state in which a computer that realizes the color measuring system 10 can start a color measuring process for the next color. For example, it is assumed that, about a k-th color ($1 \le k \le n$) among the first to n-th colors, it is determined by the determining section 16 that a measured color and a comparison target color coincide. In this case, the control section 18 performs control for automatically advancing the color measuring process to a next color measuring process for performing the color measurement for the next k+1-th color of the k-th color. For example, it is assumed that, when a color number of the color measurement is k, the color measurement for the k-th color is performed. In this case, when it is determined that the measured color and the comparison target color coincide about the k-th color, the control section 18 updates the color number of the color measurement from k to k+1 to automatically advance the color measuring process to a next color measuring process for performing the color measurement for the next k+1-th color. For example, when operation for instructing the color measurement is performed by the user, the color measurement for the next k+1-th color is performed by the color measuring section 12.

When it is determined that the measured color and the comparison target color do not coincide, the control section 18 performs processing for automatically continuing a color measuring process for performing the color measurement for the present color. Automatically continuing the color measuring process means that the computer that realizes the color measuring system 10 continues the color measuring process. For example, it is assumed that, about the k-th color among the first to n-th colors, it is determined by the determining section 16 that the measured color and the comparison target color do not coincide. In this case, the control section 18 performs control for continuing a color measuring process for performing the color measurement for the k-th color, which is the present color. For example, it is assumed that, when the color number of the color measurement is k, the color measurement for the k-th color is performed. At this time, when it is determined about the k-th color that the measured color and the comparison target color do not coincide, the control section 18 does not update the color number of the color measurement from k and maintains the color number as k. For example, when operation for instructing the color measurement is performed by the user, the color measurement for the present k-th color is performed again by the color measuring section 12.

When it is determined that the measured color and the comparison target color do not coincide and user operation for advancing the color measuring process to next the color measuring process for the next color is performed, the control section 18 advances the color measuring process to the next color measuring process for performing the color measurement for the next color. For example, in a state in which it is determined that the measured color and the comparison target color do not coincide, when the user operation for advancing the color measuring process to next the color measuring process for the next color is not performed, the control section 18 continues the color measuring process for performing the color measurement for the present color. When the user operation for advancing the color measuring process to the next color measuring process for the next color is performed, the control section 18 advances the color measuring process to the next color measuring process for performing the color measurement for the next color. For example, when it is determined by the determining section 16 that the measured color and the comparison target color do not coincide, for example, the control section 18 determines whether the operation for advancing the color measuring process to the next color measuring process for the next color is performed by the user. For example, the control section 18 determines whether operation for instructing increment of the color number of the color measurement is performed. For example, when the operation for advancing the color measuring process to the next color measuring process for the next color is not performed, that is, when the operation for instructing increment of the color number of the color measurement is not performed, the control section 18 continues the color measuring process for performing the color measurement for the present color. For example, when operation for instructing the color measurement is performed by the user, the color measurement for the present color is performed again by the color measuring section 12. On the other hand, when the operation for advancing the color measuring process to the next color measuring process for the next color is performed, that is, the operation for instructing increment of the color number of the color measurement is performed, the control section 18 advances the color measuring process to the next color measuring process for performing the color measurement for the next color. For example, when the operation for instructing the color measurement is performed by the user, the color measurement for the next color is performed by the color measuring section 12.

When it is determined that the last comparison target color in the color group coincides with the measured color, the control section 18 automatically advances the color measuring process to a next color measuring process for performing the color measurement for the first comparison target color in the color group. Automatically advancing the color measuring process to the next color measuring process for the first comparison target color in the color group means that the computer advances the color measuring process to a state in which the computer can start a color measuring process for the first color. For example, when it is determined about an n-th color, which is the last color, that a measured color and a comparison target color coincide, the control section 18 advances the color measuring process to a next color measuring process for performing the color measurement for a color first in order, which is the first color. For example, the control section 18 returns the color number of the color measurement from n to 1 to automatically advance the color measuring process to the next color measuring process for performing the color measurement for the first color. For example, when the operation for instructing the color measurement is performed by the user, the color measurement for the color first in order, which is the first color in the color group, is performed by the color measuring section 12. In this case, the color measurement for the color first in order is performed about the next measurement target.

When it is determined that the measured color and the comparison target color do not coincide and, even if the color measurement for the present color is repeated a predetermined number of times, the measured color does not coincide with comparison target color, the control section 18 may automatically advance the color measuring process to a next color measuring process for performing the color measurement for the next color in the color group. Automatically advancing the color measuring process to the next color measuring process for the next color in the color group means that the computer advances the color measuring process to a state in which the computer can start the color measuring process for the next color. For example, when the measured color and the comparison target color do not coincide, the control section 18 sets a count value to, for example, one, which is an initial value, and starts count processing. For example, when the operation for instructing the color measurement is performed by the user, the color measurement for the present color is performed again. The control section 18 determines whether the measured color and the comparison target color coincide. At this time as well, when it is determined that the measured color and the comparison target color do not coincide, the control section 18 increments the count value. When the measured color does not coincide with the comparison target value even if the color measurement for the present color is repeated the predetermined number of times in this way and the count value reaches the predetermined number of times, the control section 18 advances the color measuring process to the next color measuring process for performing the color measurement for the next color in the color group. For example, when the present color is the k-th color, the control section 18 advances the color measuring process to a next color measuring process for performing the color measurement for the k+1-th color.

When it is determined that the measured color and the comparison target do not coincide and, even if the color measurement for the present color is repeated the predetermined times, the measured color does not coincide with the comparison target color, the control section 18 may automatically advance the color measuring process to the next color measuring process for performing the color measurement for the first color in the color group. Automatically advancing the color measuring process to the next color measuring process for the first color in the color group means that the computer advances the color measuring process to the next color measuring process for the first color. For example, when the measured color and the comparison target color do not coincide, the control section 18 sets the count value to, for example, one, which is the initial value, and starts the count processing. For example, when the operation for instructing the color measurement is performed by the user, the color measurement for the present color is performed again and the control section 18 determines whether the measured color and the comparison target color coincide. At this time as well, when it is determined that the measured color and the comparison target color do not coincide, the control section 18 increments the count value. When the measured color does not coincide with the comparison target color even if the color measurement for the present color is repeated the predetermined number of times and the count value reaches the predetermined number of times in this way, the control section 18 advances the color measuring process to the next color measuring process for performing the color measurement for the first color in the color group. For example, when the present color is the k-th color, the control section 18 advances the color measuring process to the next color measuring process for performing the color measurement for the color first in order, which is the first color.

In the group, a permissive condition for coincidence of colors may be set for each of the colors or for the entire color group. In this case, the determining section 16 determines, based on the permissive condition set for the color group, whether the measured color and the comparison target color coincide. For example, the permissive condition for coincidence of colors is correlated with the color group and registered. The determining section 16 determines, based on the permissive condition set for the color group, whether the measured color and the comparison target color in the color group coincide.

The color measuring system 10 includes the display processing section 19. The display processing section 19 performs display processing for displaying at least one of identification information of a comparison target color of a color to be measured next and a schematic color of the comparison target color of the color to be measured next. In this embodiment, the comparison target color of the color to be measured next is described as, as appropriate, a color to be measured next. Identification information of the color to be measured next is information for causing the user to identify the color to be measured next. Examples of the identification information of the color to be measured next include a first marker for identifying the color to be measured next and number information of the color to be measured next. The first marker is a marker for causing the user to visually identify the color to be measured next when the color to be measured next is displayed on a screen or the like explained below. For example, by viewing the first marker, the user can identify which color is the color to be measured next. The number information of the color to be measured next is information of a number in the color group about the color to be measured next. By viewing the number information, the user can identify in which order in the color group the color to be measured next is. The schematic color of the color to be measured next is, for example, a color for causing the user to recognize what kind of a schematic color the color to be measured next is and is, for example, a color representing the color to be measured next with RGB values or the like.

The display processing section 19 performs display processing for displaying at least one of identification information of a color measured this time and a schematic color of the color measured this time. The identification information of the color measured this time is information for causing the user to identify the color measured this time. Examples of the identification information of the color measured this time include a second marker for identifying the color measured this time and number information of the color measured this time. The second marker is a marker for causing the user to visually identify, on the screen, the color measured this time. For example, by viewing the second marker, the user can identify which color the color measured this time is. The number information of the color measured this time is information of a number in the color group about the color measured this time. By viewing the number information, the user can identify in which order in the color group the measured color is. The schematic color of the color measured this time is, for example, a color for causing the user to recognize what kind of a schematic color the color measured this time is and is, for example, a color representing the color measured this time with RGB values or the like.

The display processing section 19 performs display processing for displaying notification information for informing completion of work of the color measurement. Since such display processing for the notification information is performed, the user can recognize that the work of the color measurement is completed. The notification information of the completion of the work of the color measurement may be notification information for informing completion of the work of the color measurement about the color group or, in the case of the line color measurement, may be notification information for informing completion of the work of the color measurement about lines.

The color measuring system 10 performs kinds of processing in this embodiment based on a program in this embodiment. The program is a program for causing a computer to function as the sections in this embodiment. The computer is a device including, for example, an operation section, a processing section, a storing section, and an output section. For example, the program in this embodiment is a program for causing the computer to function as the receiving section 14, the determining section 16, and the control section 18. The program is a program for causing the computer to function as the display processing section 19. The program is stored in, for example, an information storage medium. That is, the color measuring system 10 in this embodiment can perform the kinds of processing in this embodiment based on the program stored in the information storage medium. The information storage medium, which is a computer-readable medium, stores programs, data, and the like. A function of the information storage medium can be realized by an optical disk, a hard disk device (HDD), a semiconductor memory, or the like.

FIGS. 2 and 3 are examples of exterior views of a colorimeter 30 and a terminal device 60 that realize the color measuring system 10 in this embodiment. As shown in FIG. 2, the colorimeter 30 has, for example, a substantially cubic shape. A display section 38, a color measurement button 40, and a cross key 42 are provided on the upper surface of the colorimeter 30. A return button 44 and a power button 46 are also provided on the upper surface of the colorimeter 30. On the other hand, as shown in FIG. 3, the color measuring section 12 and a shutter 48 are provided on the lower surface of the colorimeter 30. The display section 38 is realized by, for example, a liquid crystal display or an organic EL display and displays various kinds of information to the user. The color measurement button 40 is an operation device for the user to instruct the colorimeter 30 to perform the color measurement. For example, when the user presses the color measurement button 40, the colorimeter 30 performs the color measurement using the color measuring section 12. The cross key 42 is an operation device for indicating, for example, upward, downward, left, and right directions. The return button 44 is a button for performing returning operation called back operation as well and is a button for performing ON and OFF of a power supply of the colorimeter 30. As explained above, the color measuring section 12 is realized by the color measurement sensor. For example, a plan view shape of the color measuring section 12 is a substantially circular shape. The shutter 48 protects the color measuring section 12 when the colorimeter 30 is not used. For example, when the colorimeter 30 is not used, the user performs operation for moving the shutter 48 in the direction of the color measuring section 12 and closing the shutter 48 to prevent a shock or the like from the outside from not being applied to the color measuring section 12.

The colorimeter 30 has a handy shape for enabling the user to grip the colorimeter 30 with one hand and perform the work of the color measurement. For example, the user grips side surfaces of the colorimeter 30 with the thumb and the middle finger, the third finger, the little finger, and the like and performs operation for pressing the color measurement button 40 with the index finger and indicating a direction with the cross key 42.

The terminal device 60 is a communication terminal communicably capable of coupling to the colorimeter 30 and is realized by, for example, a smartphone or a tablet PC (Personal Computer). The terminal device 60 is communicably coupled to the colorimeter 30 by wireless communication such as Bluetooth (registered trademark) or Wi-Fi (registered trademark). The terminal device 60 includes a display section 68. Operation devices such as an operation button are also provided in the terminal device 60. The display section 68 is, for example, a touch panel. The user touches the display section 68, which is the touch panel, to perform various kinds of operation.

Figure 4:
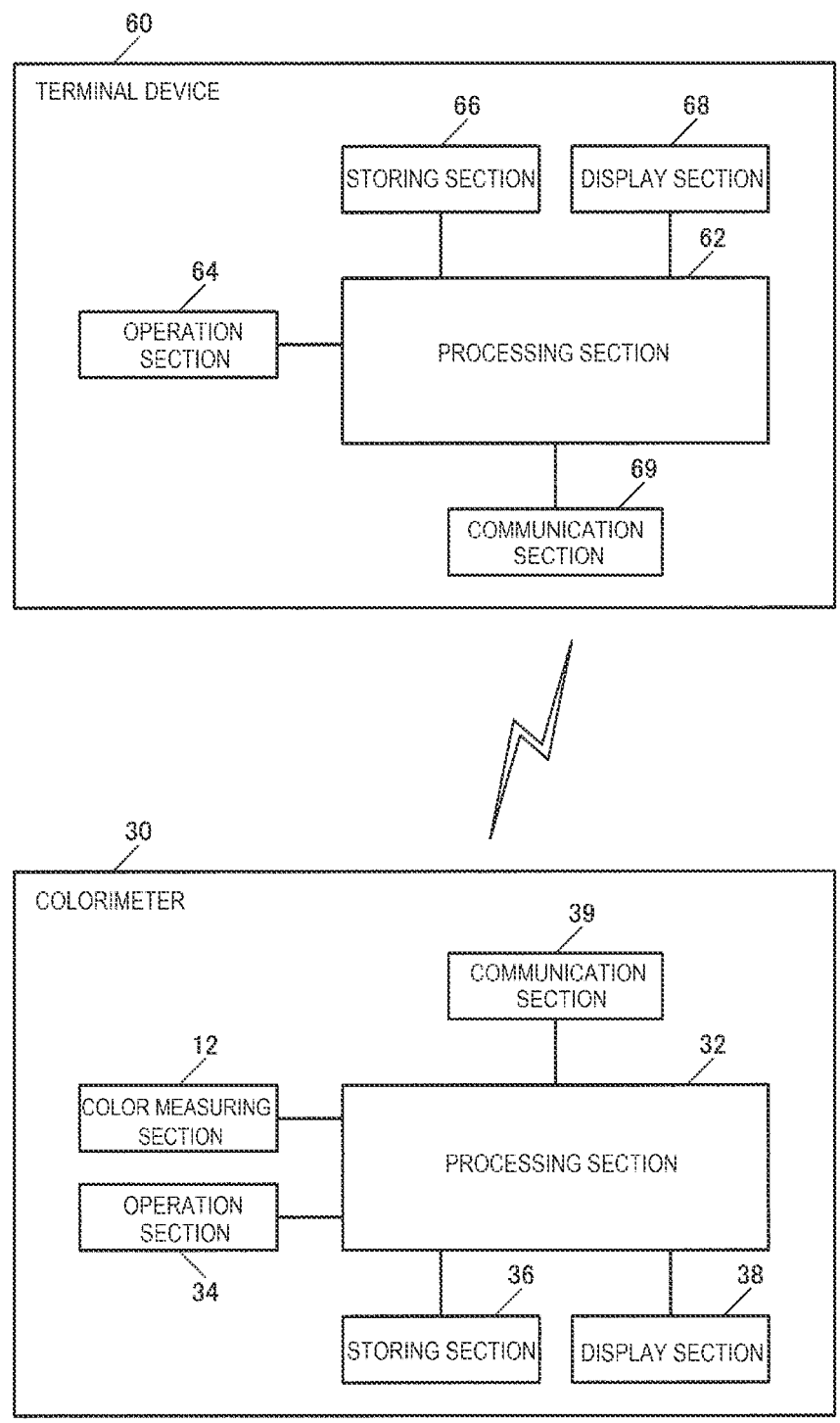
FIG. 4 is a configuration example of the colorimeter and the terminal device.

FIG. 4 is a diagram showing a configuration example of the colorimeter 30 and the terminal device 60 and shows a configuration example of the color measuring system 10 including the colorimeter 30 and the terminal device 60. The colorimeter 30 and the terminal device 60 are not limited to configurations shown in FIG. 4. Various modified implementations are possible, for example, a part of components of the colorimeter 30 and the terminal device 60 may be omitted and other components may be added.

The colorimeter 30 includes the color measuring section 12, a processing section 32, an operation section 34, a storing section 36, the display section 38, and a communication section 39. As explained above, the color measuring section 12 is realized by the color measurement sensor or the like.

The processing section 32 performs control processing for sections of the colorimeter 30 and various kinds of processing in this embodiment. For example, the processing section 32 performs control processing for the color measuring section 12 and acquisition processing for color measurement data from the color measuring section 12. The processing section 32 performs input processing for operation information of the user input by the operation section 34, processing for reading out information from the storing section 36, and processing for writing information in the storing section 36. The processing section 32 performs processing for displaying information on the display section 38 and processing for controlling communication of the communication section 39. The processing section 32 can be realized by a processor. For example, the kinds of processing in this embodiment can be realized by a processor that operates based on information such as programs and a memory that stores the information such as programs. The memory is the storing section 36. For example, functions of sections of the processor may be realized by individual hardware or the functions of the sections may be realized by integrated hardware. For example, the processor includes hardware. The hardware can include at least one of a circuit that processes a digital signal and a circuit that processes an analog signal. For example, the processor can also be configured by one or a plurality of circuit devices or one or a plurality of circuit elements mounted on a circuit board. The processor may be, for example, a CPU (Central Processing Unit). However, the processor is not limited to the CPU. Various processors such as a GPU (Graphics Processing Unit) and a DSP (Digital Signal Processor) can be used. The processor may be a hardware circuit by an ASIC (Application Specific Integrated Circuit). The processor may include an amplifier circuit or a filter circuit that processes an analog signal.

The operation section 34 is an operation interface that inputs operation information of the user. The operation section 34 can be realized by operation devices. Referring to FIG. 2 as an example, the operation section 34 can be realized by operation devices such as the color measurement button 40, the cross key 42, the return button 44, and the power button 46. However, the operation devices realizing the operation section 34 are not limited to these operation devices.

The storing section 36 stores various kinds of information. For example, the storing section 36 stores programs and data. The storing section 36 functions as a work area for the processing section 32 and the communication section 39. For example, the storing section 36, which is the memory, may be a semiconductor memory such as an SRAM (Static Random Access Memory) or a DRAM (Dynamic Random Access Memory), may be a register, or may be a hard disk device or the like. For example, the storing section 36, which is the memory, stores a computer-readable instruction. The instruction is executed by the processing section 32, which is a processor, whereby processing of sections of the processing section 32 is realized. The instruction may be an instruction set configuring a program or may be an instruction for instructing an operation to a hardware circuit of the processor.

The display section 38 displays various kinds of information to the user. The display section 38 can be realized by various displays such as a liquid crystal display and an organic EL display. The display section 38 displays, for example, information necessary for the user to operate the colorimeter 30 and various kinds of status information of the colorimeter 30.

The communication section 39 is a communication interface that performs wireless or wired communication between the communication section 39 and an external device. The communication section 39 can be realized by hardware such as an ASIC for communication or a processor for communication, firmware for communication, and the like. For example, the communication section 39 performs communication with an external device such as the terminal device 60 by near field wireless communication such as Bluetooth (registered trademark). Specifically, the communication section 39 performs communication with the external device by wireless communication of a BLE (Bluetooth Low Energy) standard. Alternatively, the communication section 39 may perform communication with the external device by wireless communication of another standard such as Wi-Fi (registered trademark). The communication section 39 may perform wireless communication by a standard such as USB.

The terminal device 60 includes a processing section 62, an operation section 64, a storing section 66, the display section 68, and a communication section 69.

The processing section 62 performs control processing for the sections of the terminal device 60 and the kinds of processing in this embodiment. For example, the processing section 62 performs processing for inputting operation information of the user input by the operation section 64, processing for reading out information from the storing section 66, and processing for writing information in the storing section 66. The processing section 62 performs processing for displaying information on the display section 68, processing for controlling communication of the communication section 69, and the like. The processing section 62 can be realized by the processor or the like explained above.

The operation section 64 is an operation interface that inputs operation information of the user. The operation section 64 can be realized by operation devices. Referring to FIG. 2 as an example, the operation section 64 can be realized by operation devices such as operation buttons provided in a touch panel of the display section 68 or the terminal device 60. However, the operation devices realizing the operation section 64 are not limited to these operation devices.

The storing section 66 stores various kinds of information. For example, the storing section 66 stores programs and data. The storing section 66 functions as, for example, a work area for the processing section 62 and the communication section 69. For example, the storing section 66, which is a memory, may be a semiconductor memory such as an SRAM or a DRAM, may be a register, or may be a hard disk device or an optical disk device. For example, the storing section 66, which is the memory, stores a computer-readable instruction. The instruction is executed by the processing section 62, which is the processor, whereby processing of sections of the processing section 62 is realized.

The display section 68 displays various kinds of information to the user. The display section 68 can be realized by various displays such as a liquid crystal display and an organic EL display. The display section 68 is realized by, for example, a touch panel and functions as the operation section 64 as well. The display section 68 displays, for example, information necessary for the user to operate the terminal device 60 and various kinds of status information of the terminal device 60 and the colorimeter 30.

The communication section 69 is a communication interface that performs wireless or wired communication between the communication section 69 and an external device. The communication section 69 can be realized by hardware such as an ASIC for communication or a processor for communication, firmware for communication, and the like. For example, the communication section 69 performs communication with an external device such as the colorimeter 30 by near field wireless communication such as Bluetooth. Specifically, the communication section 69 performs communication with the external device by wireless communication of the BLE standard. Alternatively, the communication section 69 may perform communication with the external device by wireless communication of another standard such as Wi-Fi. The communication section 69 may perform wired communication by a standard such as USB.

The processing of the color measuring system 10 in this embodiment may be realized by, for example, the processing section 62 of the terminal device 60. In this case, the processing section 62 includes the receiving section 14, the determining section 16, the control section 18, and the display processing section 19 and performs processing of these sections. For example, the program in this embodiment is installed in the terminal device 60 as an application program and stored in the storing section 66. The application program executes the kinds of processing of the receiving section 14, the determining section 16, the control section 18, and the display processing section 19. Alternatively, the processing of the color measuring system 10 may be realized by the processing section 32 of the colorimeter 30. In this case, the processing section 32 includes the receiving section 14, the determining section 16, the control section 18, and the display processing section 19 and performs processing of these sections. For example, a program stored in the storing section 36 executes the kinds of processing of the receiving section 14, the determining section 16, the control section 18, and the display processing section 19. Alternatively, the processing of the color measuring system 10 may be realized by distributed processing of the processing section 32 and the processing section 62.

2. Display Processing in the Color Measurement for a Color Group

The color measurement includes single color measurement for simply measuring only one color and group color measurement for measuring a group of a plurality of colors. Complicated operation is necessary for the group color measurement. When the user is unaccustomed to color measurement work, the user does not know how to handle the colorimeter 30. The color measurement work means involving the color measurement in a part of entire work performed by the user.

The color measurement work is explained with reference to a typical example. The color measurement work includes work in which a company, which prints and sells cloth, performs the color measurement and determines whether a color printed on the cloth is proper. However, some cloth or the like has large color measurement variation because of unevenness of the surface of the cloth or the like. Therefore, when the color measurement is performed, even if the color measurement is performed and a color difference $\Delta E$ exceeds a range of a permissible value and is no good, the user sometimes performs the color measurement again by way of caution and checks whether the color difference certainly exceeds the range of the permissible value. When the user repeatedly performs the color measurement and color differences are large in the color measurement, a determined standard is not observed. Therefore, the user has to stop the remaining color measurement for the print and take measures such as reprinting. Not only in such an example, in general, the color measurement work needs complicate work.

First, an example of information that needs to be displayed in the color measuring system 10 is explained. Since information that can be displayed is limited in the colorimeter 30 of a handy mobile type, such display is desirable. Naturally, this is not essential. In the case of projection on a large screen, display is not limited to such display all the more. For example, information concerning an operation method and work progress includes identification information of a color to be measured next, a schematic color of the color to be measured next, and notification information of completion of work. These kinds of information are information that the user, who is an operator, desires to learn before and after operation in smoothly performing the color measurement work and are information with high priority.

The information concerning the operation method and the work progress also includes information concerning a method of holding a main body and a method of moving the main body. However, these kinds of information are information with low priority.

Information concerning an operation result includes identification information of a color measured this time, a schematic color of the color measured this time, a color difference between a measured color and a comparison target color, a determination result of OK or NG of the color difference with respect to the permissible value, and a determination result of OK or NG for entire work. These kinds of information are information with high priority.

The information concerning the operation result also includes information such as an Lab value, a CH value, RGB and CMYK values on a designated profile, selection of an approximate color from an external color sample book, information concerning whether a color is within a designated color gamut range of a printing device, a recommended coordinate color, and a history of color measurement result in the past. However, these kinds of information are information with low priority.

Information concerning a state of equipment includes information concerning battery remaining power and a connection state of communication. These kinds of information are information with high priority.

The information concerning the state of the equipment also includes information concerning setting of an M factor and setting of an environmental light source. However, these kinds of information are information with low priority.

Therefore, in this embodiment, in the group color measurement for measuring a color group, a method of displaying the information concerning the operation method and the progress state, the information concerning the operation result, and the information concerning the state of the equipment while reflecting the priority is adopted. The group color measurement includes group color measurement by spot color measurement and group color measurement by line color measurement. In the following explanation, the method in this embodiment is explained in detail with reference to transition examples of screens in the colorimeter 30 and the terminal device 60.

Figure 5:
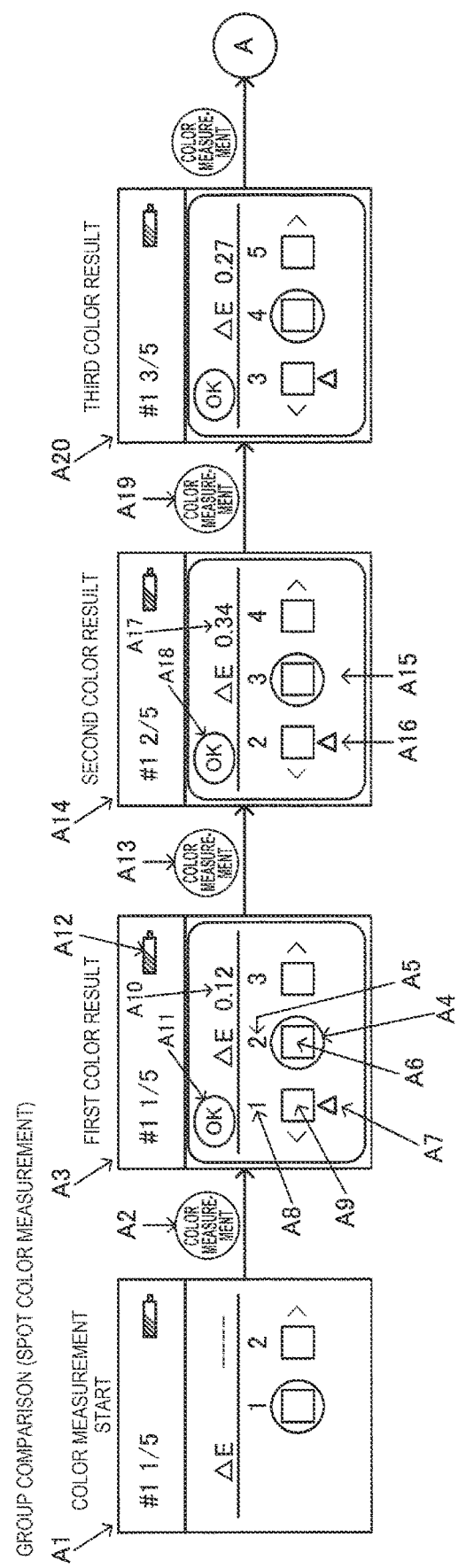
FIG. 5 is a screen transition example of group color measurement by spot color measurement in the colorimeter.
Figure 6:
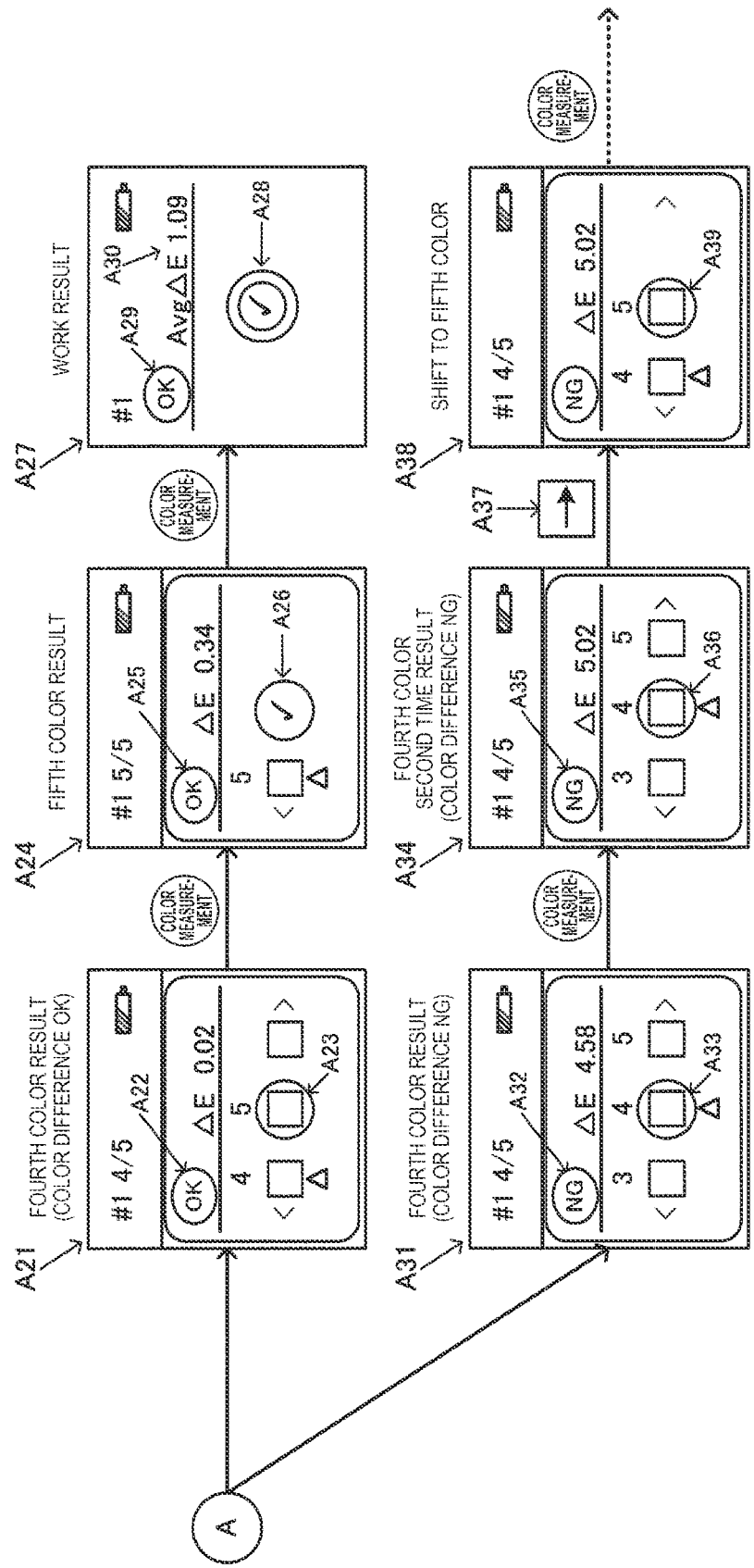
FIG. 6 is a screen transition example of the group color measurement by the spot color measurement in the colorimeter.

FIGS. 5 and 6 are diagrams showing screen transition examples of the group color measurement by the spot color measurement in the colorimeter 30. Screens shown in the figures are displayed on the display section 38 of the colorimeter 30. When the color measurement button 40 is pressed as shown in A2 in a state in which a screen of a color measurement start shown in A1 is displayed on the display section 38, the color measurement for a color first in order in the color group is performed and a color measurement result screen of the color first in order shown in A3 is displayed on the display section 38.

On a screen in A3, as shown in A4 and A5, a first marker for identifying a color to be measured next and number information of a color to be measured are displayed. The number information shown in A5 indicated by the first marker shown in A4 is identification information of the color to be measured next. The identification information of the color to be measured next is identification information of a comparison target color of the color to be measured next. By viewing the number information in A5, the user can identify in which order in the color group the color to be measured next is. For example, on the screen in A3, a color second in order in the color group is the color to be measured next.

On the screen in A3, a schematic color of the color to be measured next is displayed as shown in A6 in the marker shown in A4. For example, a schematic color obtained by causing a display to develop a color with RGB values of the color to be measured next is displayed. A schema of the color to be measured next is a schema of the comparison target color of the color to be measured next. By viewing the schematic color in A6, the user can learn what kind of a schematic color the color to be measured next is. For example, the first marker in A4 is a circular marker surrounding the schematic color in A6. The number information in A5 is displayed near the schematic color in A6. Consequently, by viewing the schematic color surrounded by the first marker, the user can recognize a schema about what kind of a color the color to be measured next is. By viewing the number information displayed near the schematic color, the user can learn in which order in the color group the color to be measured next is. That is, the user can recognize that the color to be measured next is the color second in order in the color group. Note that other information is not prevented from being displayed. The other information is, for example, a name of the color to be measured next and RGB values of the color to be measured next.

On the screen in A3, as shown in A7 and A8, a second marker for identifying a color measured this time and number information of the color measured this time are displayed. The second marker shown in A7 and the number information shown in A8 are identification information of the color measured this time. By viewing the second marker in A7, the user can identify which color the color measured this time is. By viewing the number information in A8, the user can identify in which order in the color group the color measured this time is. For example, on the screen in A3, the color first in order in the color group is the color measured this time.

On the screen in A3, a schematic color of the color measured this time is displayed as shown in A9. For example, a schematic color obtained by representing the color measured this time with RGB values is displayed. By viewing the schematic color in A9, the user can learn what kind of a schematic color the color measured this time is. For example, the second marker in A7 is a triangle arrow marker pointing the schematic color in A9. The number information in A8 is displayed near the schematic color in A9. Consequently, by viewing the schematic color pointed by the second marker, the user can recognize a schema about what kind of a color the color measured this time is. By viewing the number information displayed near the schematic color, the user can learn in which order in the color group the color measured this time is. That is, the user can recognize that the color measured this time is the color first in order in the color group.

On the screen in A3, as shown in A10 and A11, a color difference $\Delta E$ and a determination result of the color difference $\Delta E$ are displayed. The color difference $\Delta E$ shown in A10 is a color difference between the measured color first in order and a first comparison target color corresponding to the color first in order in the color group. The determination result shown in A11 is a determination result of the color difference $\Delta E$ with respect to the permissible value. Since the color difference $\Delta E$ is equal to or smaller than the permissible value, the determination result is OK. On the screen in A3, information concerning battery remaining power of the colorimeter 30 is also displayed as shown in A12. Although not shown, information concerning a connection state of communication between the colorimeter 30 and the terminal device 60 is also displayed. For example, information concerning whether communication such as Bluetooth is connected is displayed.

When the color measurement button 40 is pressed as shown in A13 in a state in which the display section 38 displays the screen in A3, the color measurement for the color second in order in the color group is performed. A color measurement result screen of the color second in order is displayed as shown in A14.

On a screen in A14 as well, as shown in A15, the circular first marker, which is the identification information of the color to be measured next, the number information, and the schematic color of the color to be measured next are displayed. As shown in A16, the triangle arrow second marker, which is the identification information of the color measured this time, the number information, and the schematic color of the color measured this time are displayed. For example, on the screen in A14, a color third in order in the color group is the color to be measured next time and the color second in order in the color group is the color measured this time.

On the screen in A14 as well, as shown in A17 and A18, the color difference ΔE and the determination result of the color difference ΔE are displayed. The color difference ΔE shown in A17 is a color difference between the measured color second in order and a second comparison target color corresponding to the color second in order in the color group. The determination result shown in A18 is a determination result of the color difference ΔE with respect to the permissible value. Since the color difference ΔE is equal to or smaller than the permissible value, the determination result is OK.

When the color measurement button 40 is pressed as shown in A19 in a state in which the display section 38 displays the screen in A14, the color measurement for the color third in order in the color group is performed and a color measurement result screen of the color third in order is displayed as shown in A20. On a screen in A20 as well, the identification information of the color to be measured next, the schematic color, and the color difference ΔE and the determination result of the color difference ΔE are displayed.

As explained above, in this embodiment, the display processing section 19 performs processing for displaying the identification information of the color to be measured next and the schematic color of the color to be measured next. That is, the display processing section 19 performs display processing for the identification information of the comparison target color of the color to be measured next and the comparison target color of the color to be measured next. As explained above, the display processing section 19 is realized by the processing section 32 and the processing section 62 shown in FIG. 4. For example, as shown in A4 and A5 in FIG. 5, the display processing section 19 performs processing for displaying, as the identification information of the color to be measured next, the circular first marker and the number information of the color to be measured next. As shown in A6, the display processing section 19 performs processing for displaying the schematic color of the color to be measured next. In this way, the user can identify which color the color to be measured next is and in which order in the color group the color to be measured next is and learn what kind of a schematic color the color to be measured next is. Consequently, the user can visually recognize information concerning the color to be measured next and can smoothly perform the work of the color measurement.

The display processing section 19 performs processing for displaying at least one of the identification information of the color measured this time and the schematic color of the color measured this time. For example, as shown in A7 and A8 in FIG. 5, the display processing section 19 performs processing for displaying, as the identification information of the color measured this time, the triangle arrow second marker and the number information of the color measured this time. As shown in A9, the display processing section 19 performs processing for displaying the schematic color of the color measured this time. In this way, the user can identify which color the color measured this time is and in which order in the color group the color measured this time is and learn what kind of a schematic color the color measured this time is. Consequently, the user can visually check the information concerning the color measured this time. Smoothing of the work of the color measurement for the color group can be achieved.

In this embodiment, when it is determined that the measured color and the comparison target color coincide, the control section 18 automatically advances the color measuring process to the next color measuring process for performing the color measurement for the next color in the color group. As explained above, the determining section 16 and the control section 18 are realized by the processing section 32 and the processing section 62 shown in FIG. 4. For example, in A3 and A11 in FIG. 5, it is determined by the determining section 16 that, about the color first in order in the color group, the measured color and the comparison target color coincide. Specifically, it is determined that the color difference ΔE between the measured color and the comparison target color is equal to or smaller than the permissible value and the determination result of the color difference ΔE is OK. In this case, the control section 18 automatically advances the color measuring process to a next color measuring process for performing the color measurement for the color second in order, which is the next color in the color group. For example, a number of the color to be measured next is updated from 1 to 2. As shown in A4, A5, and A6, identification information and a schematic color of the color second in order to be measured next are displayed in the center of the screen. In A14 and A18 in FIG. 5, it is determined that, about the color second in order in the color group, the measured color and the comparison target color coincide. In this case, the control section 18 automatically advances the color measuring process to a next color measuring process for performing the color measurement for the color third in order, which is the next color in the color group. For example, the number of the color to be measured next is updated from 2 to 3. As shown in A15, the identification information and the schematic color of the color third in order to be measured next are displayed in the center of the screen.

In FIG. 6, screen transition examples in the case in which a determination result of the color difference ΔE of a color fourth in order in the color group is OK and the case in which the determination result is NG are shown. On a screen in A21 in FIG. 6, as shown in A22, it is displayed that the determination result of the color difference ΔE of the color fourth in order in the color group is OK. In this case, the control section 18 automatically advances the color measuring process to a next color measuring process for performing the color measurement for a color fifth in order, which is the next color in the color group. As shown in A23, identification information and a schematic color of the color fifth in order to be measured next are displayed in the center of the screen. On a screen in A24, as shown in A25, it is displayed that a determination result of the color difference ΔE of the color fifth in order, which is the last color in the color group, is OK. In this case, as shown in A26, a marker indicating that a color to be measured next is absent is displayed. The control section 18 informs the user that the work of the color measurement is completed. On a work result screen in A27 as well, a marker for informing the work completion is displayed as shown in A28. The control section 18 informs the user that the work of the color measurement is completed. As shown in A29, it is displayed that a determination result of the color difference ΔE in the entire color group is OK. As shown in A30, an average of the color difference ΔE about the measured color group is also displayed.

As explained above, in this embodiment, the display processing section 19 performs processing for displaying the notification information for informing the completion of the work of the color measurement. For example, when the last color measurement for the color group ends, as shown in A26 in FIG. 6, the marker indicating that a color to be measured next is absent is displayed. The control section 18 informs the user that the work of the color measurement for the color group is completed. On the work result screen in A27 as well, the marker for informing the work completion is displayed. The control section 18 informs the user that the work of the color measurement for the color group is completed. If such notification information such as a marker for informing the completion of the work of the color measurement is displayed on the screen, by viewing the notification information, the user can visually confirm that the work of the color measurement for the color group is completed. Smoothing of the work of the color measurement for the color group can be achieved.

On the other hand, on a screen in A31 in FIG. 6, it is displayed that the determination result of the color difference ΔE of the color fourth in order in the color group is NG. When it is determined that a measured color and a comparison target color do not coincide in this way, a color measuring process for measuring the present color is automatically continued. For example, when the number of the color to be measured next is not updated from 4 and, as shown in A33, identification information and a schematic color of the present color fourth in order are displayed as the color to be measured next. That is, in A33, it is displayed that both of the color measured this time and the color to be measured next are the color fourth in order in the color group. On a screen in A34, second color measurement is performed for the color fourth in order in the color group. In A35, it is displayed that a determination result of the color difference ΔE is also NG in the second color measurement for the color fourth in order. In this case as well, the color measuring process for measuring the present color is automatically continued. As shown in A36, the identification information and the schematic color of the present color fourth in order are displayed as the color to be measured next. As shown in A37, the user indicates the right direction with the cross key 42 of the colorimeter 30 shown in FIG. 2. Operation for advancing the color measuring process to the next color measuring process for the next color is performed. Consequently, as shown in A38, the color measuring process proceeds to the color measuring process for the color fifth in order, which is the next color. As shown in A39, it is displayed that the color to be measured next is the color fifth in order. Thereafter, the screen shown in A24 and A25 is displayed.

As explained above, in this embodiment, when it is determined by the determining section 16 that the measured color and the comparison target color do not coincide, the control section 18 continues the color measuring process for measuring the present color when user operation for advancing the color measuring process to the next color measuring process for the next color is not performed and advances the color measuring process to the next color measuring process for performing the color measurement for the next color when the user operation for advancing the color measuring process to the next color measuring process for the next color is performed. For example, when the user operation for advancing the color measuring process to the next color measuring process for the next color, which is the indication of the right direction by the cross key 42, is not performed, as shown in A31 and A34, the color measuring process for measuring the present color is continued. On the other hand, when the user operation for advancing the color measuring process to the next color measuring process for the next color is performed as shown in A37, as shown in A38, the control section 18 advances the color measuring process to the next color measuring process for performing the color measurement for the next color. In this way, when the measured color and the comparison target color do not coincide, the color measuring process for measuring the present color is continued when the user does not indicate an intention to advance the color measuring process to the next color measuring process and the color measuring process proceeds to the next color measuring process for measuring the next color when the user indicates an intention to advances the color measuring process to the next color measuring process. Therefore, the control section 18 can realize control for advancing the color measuring process to the next color measuring process reflecting the intention of the user. The user operation for advancing the color measuring process to the next color measuring process for the next color may be indication of the upward direction by the cross key 42. When the left direction or the downward direction is indicated by the cross key 42, the control section 18 returns to the color measuring process for the previous color. In this embodiment, the user operation is simply described as operation as appropriate.

Figure 7:
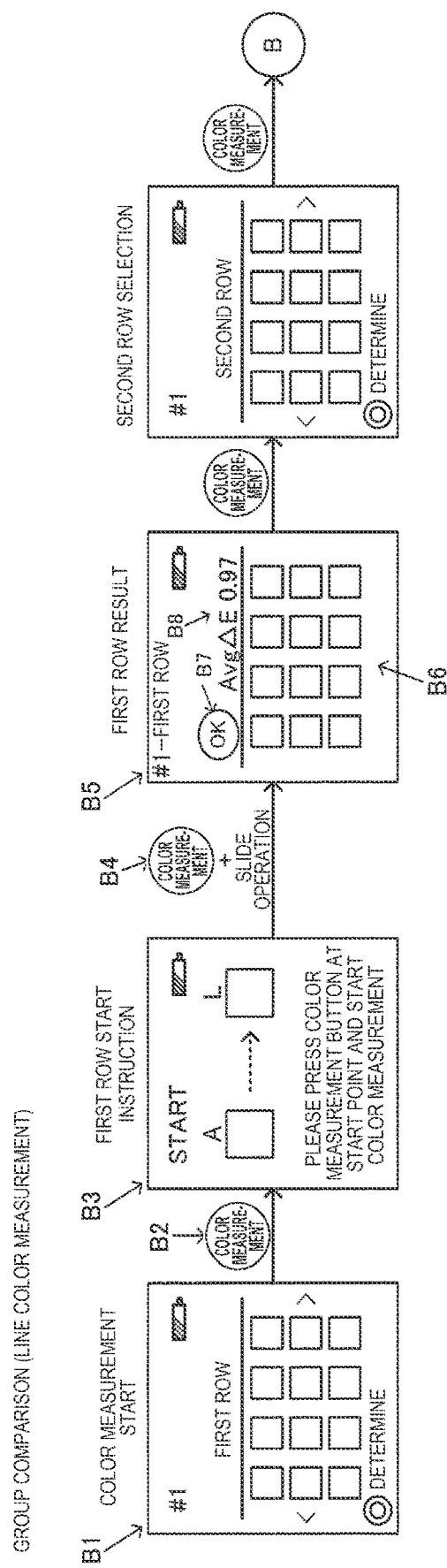
FIG. 7 is a screen transition example of group color measurement by line color measurement in the colorimeter.
Figure 8:
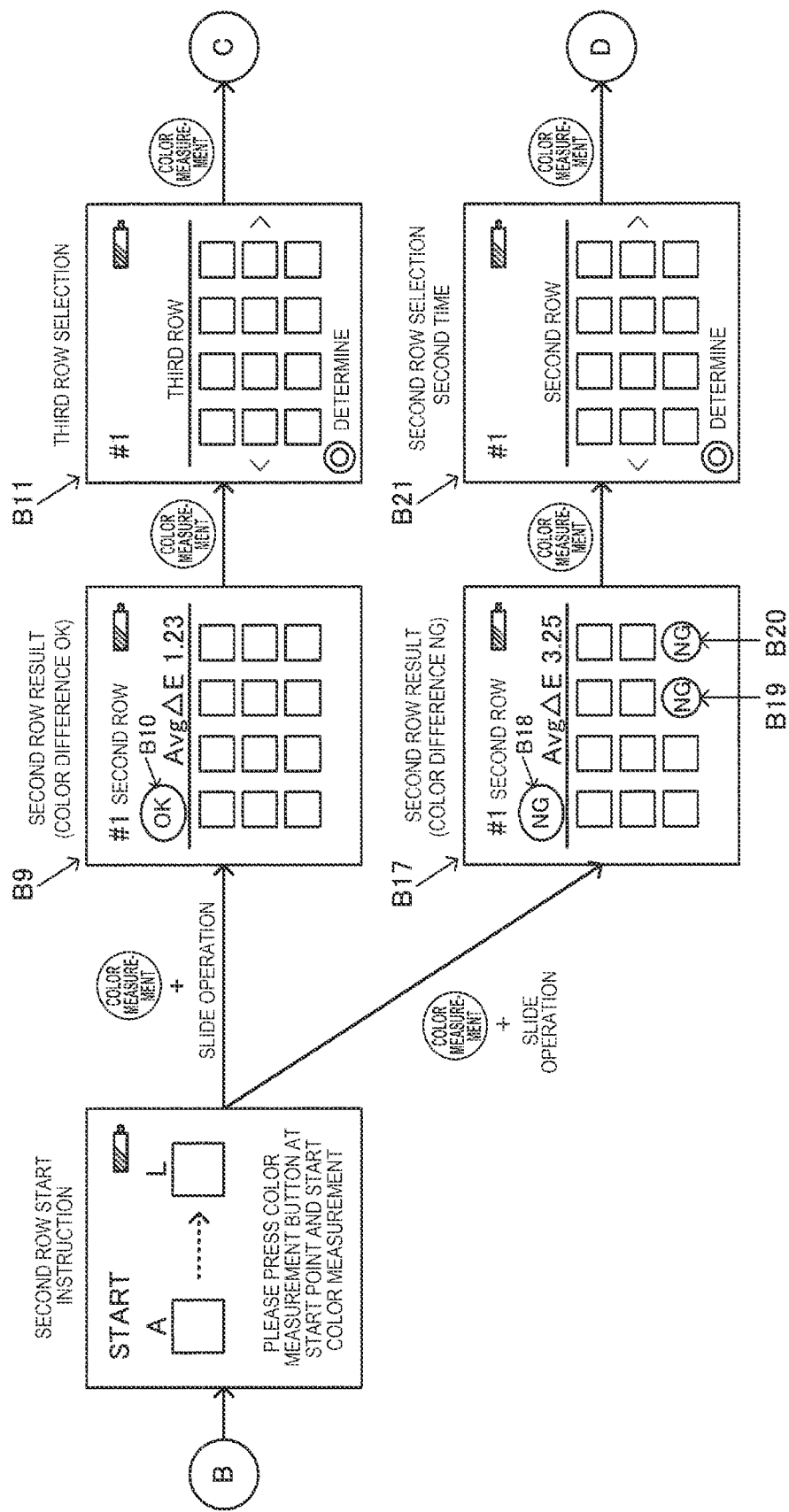
FIG. 8 is a screen transition example of the group color measurement by the line color measurement in the colorimeter.
Figure 9:
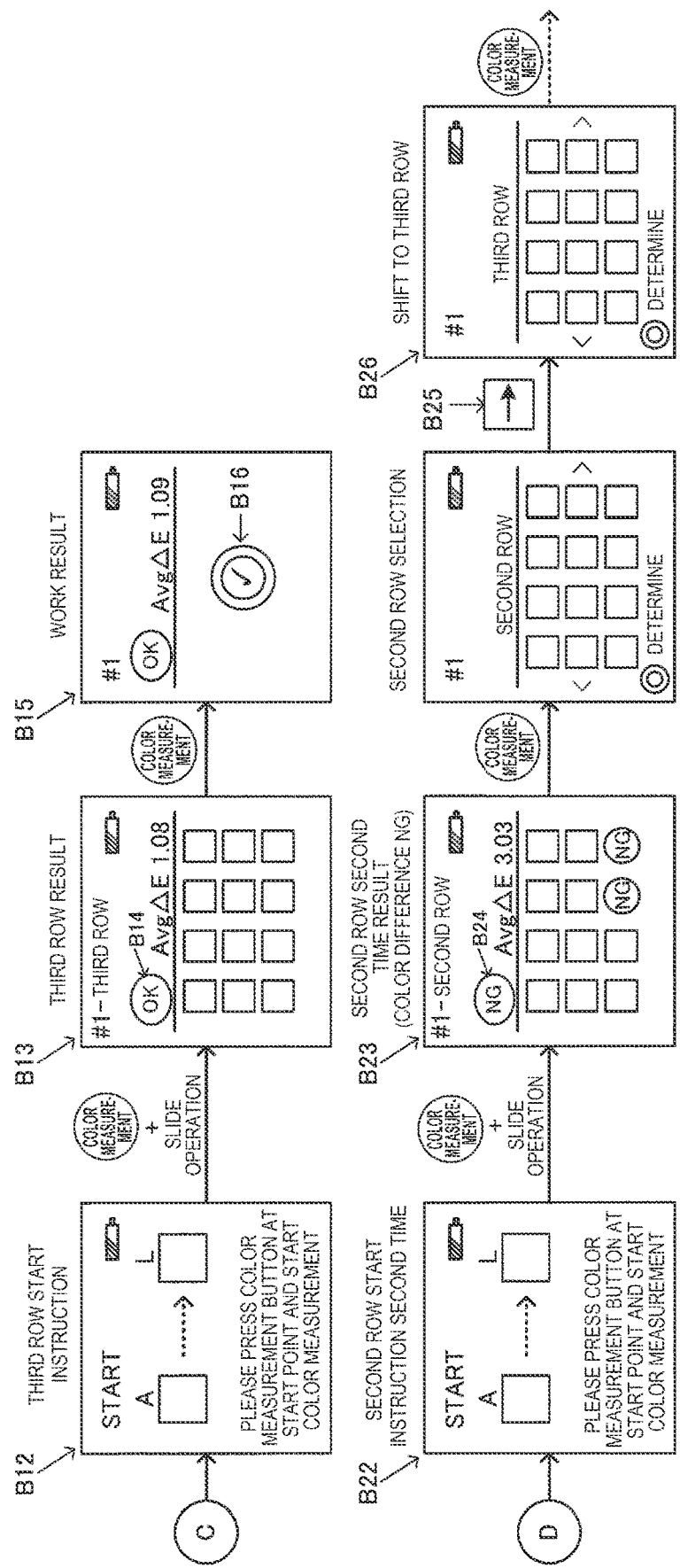
FIG. 9 is a screen transition example of the group color measurement by the line color measurement in the colorimeter.

FIGS. 7, 8, and 9 are diagrams showing screen transition examples of the group color measurement by the line color measurement in the colorimeter 30. When the color measurement button 40 is pressed as shown in B2 in a state in which a start screen for the line color measurement in B1 in FIG. 7 is displayed on the display section 38, a start instruction screen for the color measurement in a first row is displayed as shown in B3. A guide indicator indicating operation content of the line color measurement is displayed to the user. When the user performs operation of the color measurement button 40 and slide operation as shown in B4, the color measurement for a line in the first row is performed and a result screen in the first row shown in B5 is displayed. For example, the user presses the color measurement button 40 at a start point of the first row and performs operation for sliding the colorimeter 30 along the line of the first row, which is a measurement target, whereby the color measurement for the first row is performed. In this case, the user may press the color measurement button 40 at the start point of the first row and, after sliding the colorimeter 30, press the color measurement button 40 again at an end point of the first row. Alternatively, the user may slide the colorimeter 30 from the start point of the first row while keeping pressing the color measurement button 40 and separates a pressing finger from the color measurement button 40 at the end point of the first row.

On the result screen in B5, as shown in B6, a schematic color of a result of a color for which the line color measurement is performed is displayed. The number of colors of a color group in one row is twelve. Schematic colors of the twelve colors in the color group are displayed. On the screen shown in B5, as shown in B7 and B8, a determination result of the line color measurement in the first row, an average of the color difference ΔE of a color in the first row, and the like are displayed.

In FIGS. 8 and 9, screen transition examples in the case in which a determination result of a color difference in a second row of the line color measurement is OK and the case in which the determination result is NG are shown. On a screen in B9 in FIG. 8, it is displayed that the determination result of the color difference in the second row is OK as shown in B10. In this case, as shown in B11 in FIGS. 8 and B12 in FIG. 9, when the color measurement button 40 is pressed, the color measuring process proceeds to the next color measuring process and the color measurement in a third row is performed. On a screen in B13 in FIG. 9, it is displayed that a determination result of a color difference in the third row is OK as shown in B14. Consequently, on a work result screen in B15, a marker for informing completion of work is displayed as shown in B16. However, as in the case of the spot color measurement, when the determination result of the color difference in the second row is OK, the screen in B9 automatically proceeds to a screen in B11 even if the user presses no button. When the user presses the color measurement button 40, the control section 18 may skip a screen in B12 and start the color measurement.

On the other hand, on a screen in B17 in FIG. 8, it is displayed that the determination result of the color difference in the second row is NG as shown in B18. As shown in B19 and B20, it is displayed that a color difference between a color eleventh in order and a color twelfth in order among twelve colors in the second row is NG. In this case, as shown in B21 in FIGS. 8 and B22 in FIG. 9, when the color measurement button 40 is pressed, the present color measuring process is continued and the color measurement in the second row is performed again. On a screen in B23 in FIG. 9, it is displayed that a second determination of the color difference in the second row is also NG as shown in B24. In this case as well, when the user indicates the right direction with the cross key 42 and performs operation for advancing the color measuring process to the next color measuring process, the color measuring process is advanced to the next color measuring process as shown in B26 and the color measurement for the third row is performed. In this case as well, when the determination result of the color difference in the second row is NG as in the case of the spot color measurement, the screen in B17 may automatically proceed to the screen in B21 even if the user presses no button. When the user presses the color measurement button 40, the control section 18 may skip the screen in B22 and start the color measurement.

Figure 10:
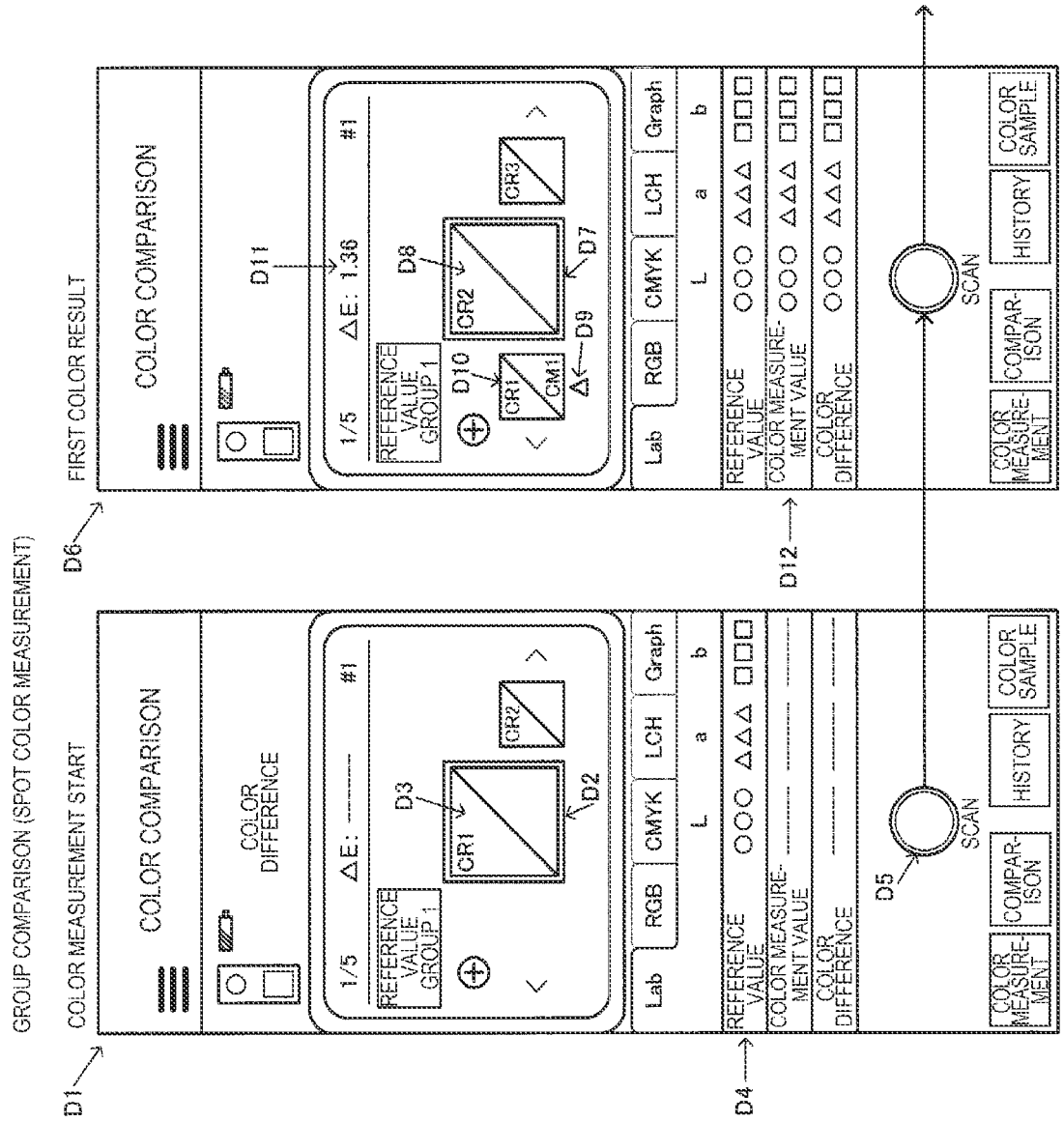
FIG. 10 is a screen transition example of the group color measurement by the spot color measurement in the terminal device.
Figure 11:
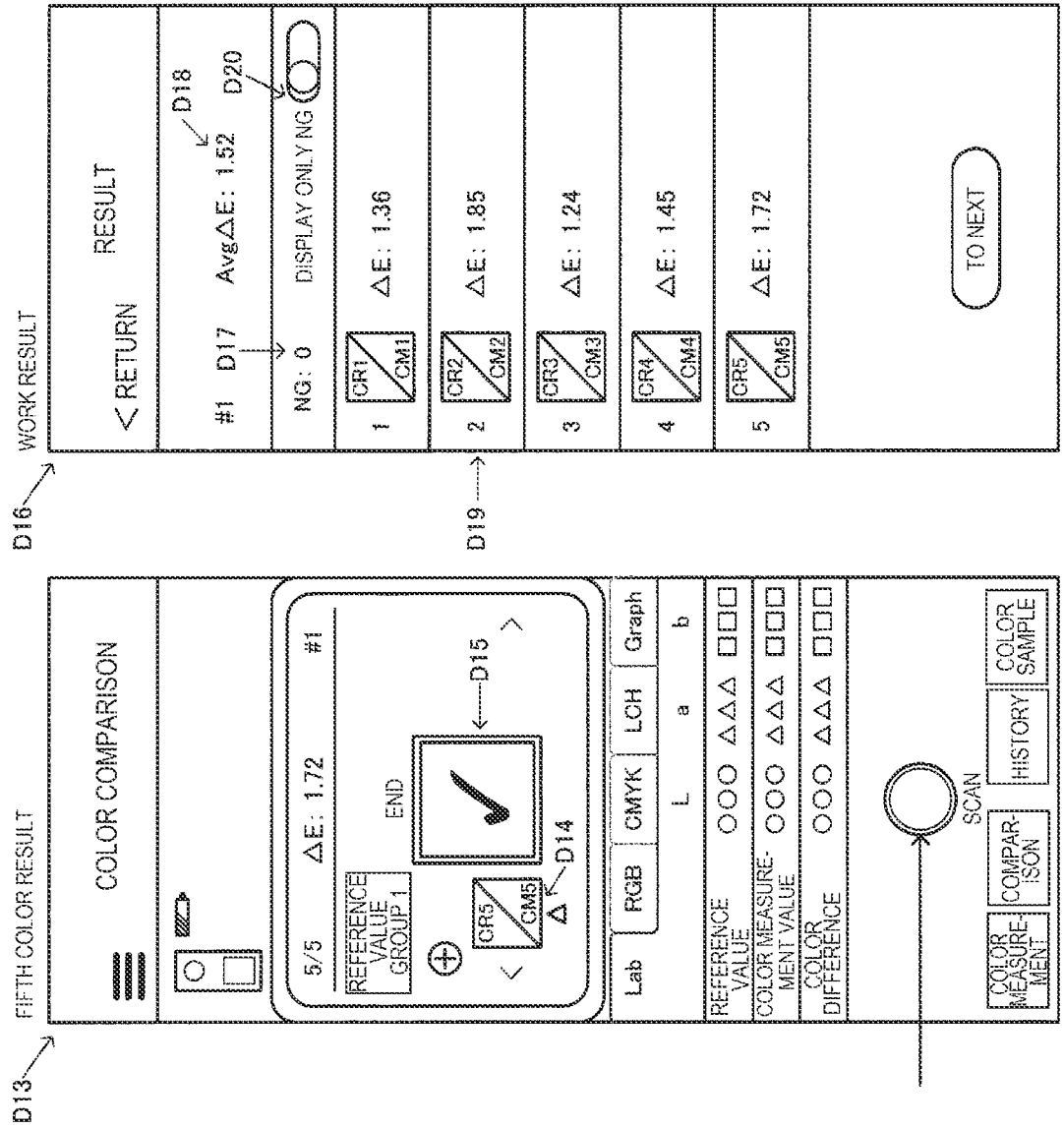
FIG. 11 is a screen transition example of the group color measurement by the spot color measurement in the terminal device.
Figure 12:
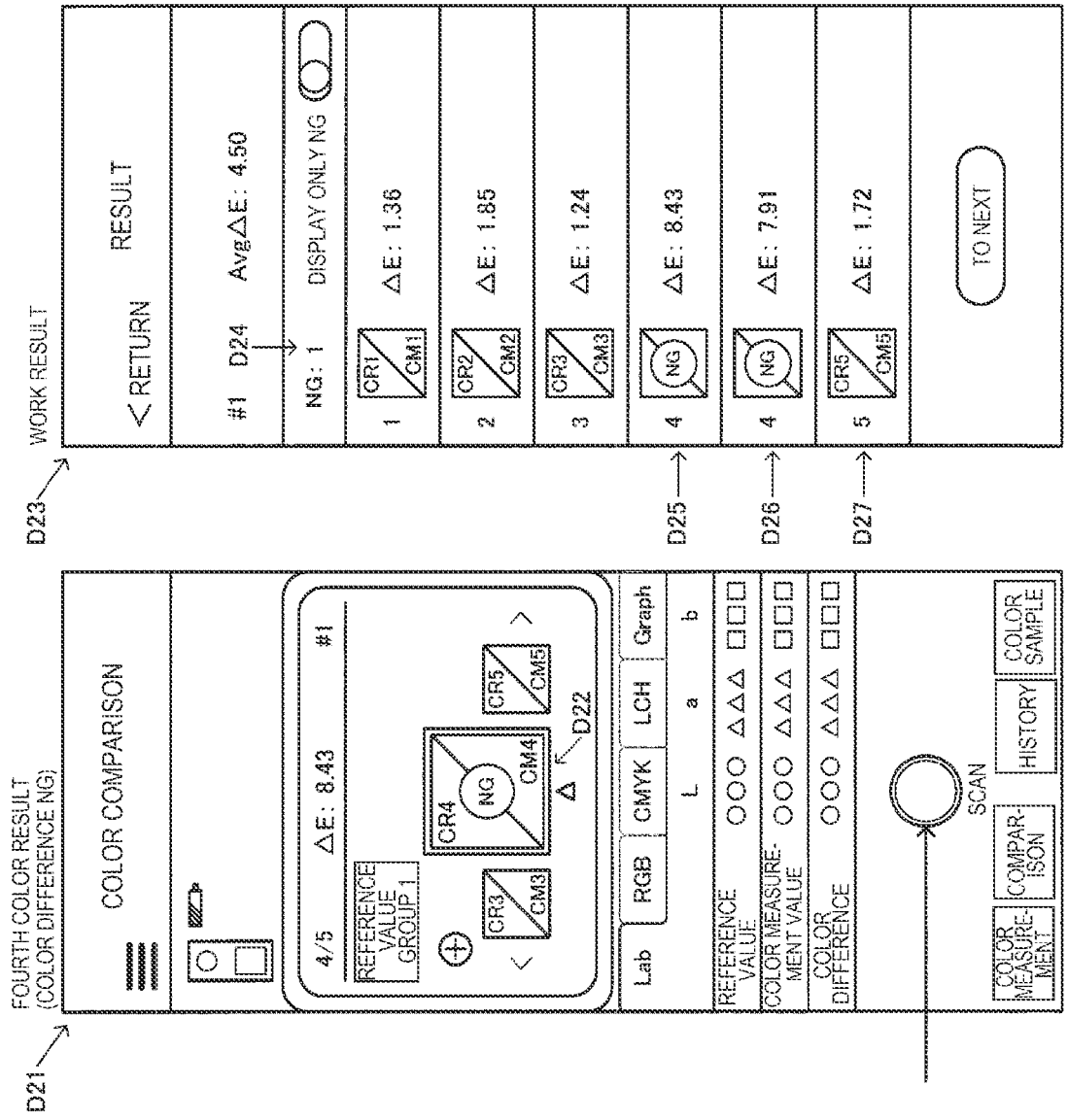
FIG. 12 is a screen transition example of the group color measurement by the spot color measurement in the terminal device.

FIGS. 10, 11, and 12 are diagrams showing screen transition examples of the group color measurement by the spot color measurement in the terminal device 60. These screens are displayed on the display section 68 of the terminal device 60.

On a screen of a color measurement start in D1 in FIG. 10, as shown in D2, a first marker for identifying the color to be measured next is displayed. As shown in D3, a schematic color of a comparison target color CR1 first in order in the color group is displayed. As shown in D4, Lab values of the comparison target color CR1, which is a color of a reference value of color comparison, are displayed. When the user operates an icon of a color measurement button on a screen shown in D5, first color measurement is performed and a result screen of a color first in order shown in D6 is displayed. Operation of the color measurement may be performed by the color measurement button 40 of the colorimeter 30. The Lab values are formally described as L*a*b* values and L, a, and b are formally described as L*, a*, and b*. However, in this embodiment, the L*a*b* values and L*, a*, and b* are described as the Lab values and L, a, and b as abbreviations. The color difference ΔE are formally described as ΔE*. However, in this embodiment, the color difference ΔE* is described as ΔE as an abbreviation.

On a screen in D6 in FIG. 10, a schematic color CR2 is displayed to paint out a square first marker D7 and a triangle D8 for identifying the color to be measured next. A second marker D9 of a triangle arrow for identifying the color measured this time is displayed. Schematic colors CR1 and CM1 are respectively displayed to paint out regions obtained by equally dividing a square D10 for identifying the color measured this time into two with one diagonal line. The color CR1 is a schematic color of a reference color, which a comparison target. The color CM1 is a schematic color of a color actually measured. As shown in D11, the color difference ΔE between the measured color CM1 and the comparison target color CR1 is also displayed. As shown in D12, Lab values of the measured color CM1 are displayed as color measurement values and Lab values of the comparison target color CR1 are displayed as reference values. Further, differences between the color measurement values and the reference values are calculated and displayed for each of components of the Lab values.

On a screen in D13 in FIG. 11, as shown in D14, it is indicated that the color measurement for the color fifth in order, which is the last color in the color group, is performed. As shown in D15, display for informing that a target to be measured next is absent is performed. On a screen of a work result in D16, as shown in D17, it is displayed that the number of cases of NG is zero and, as shown in D18, an average of the color differences ΔE of the colors in the color group is displayed. As shown in D19, the color differences ΔE and schematic colors of the colors in the color group are displayed. On this screen, since the number of cases of NG is zero, a slide button shown in D20 is disabled. However, when the number of cases of NG is one or more, the slide button shown in D20 is enabled. By operating an icon of the slide button, the user is capable of extracting and displaying only a color determined as NG.

On a screen in D21 in FIG. 12, as shown in D22, it is displayed that a determination result of the color fourth in order in the color group is NG. For example, the determination result is NG because a color difference between the measured color CM4 and the comparison target color CR4 exceeds the permissible value. In this case, the color measuring process for measuring the present color is continued. The color to be measured next is also the present color fourth in order. On a screen of a work result in D23, as shown in D24, it is displayed that the number of cases of NG is one. As shown in D25 and D26, it is displayed that the color measurement is performed twice about the color fourth in order. In the second color measurement in D26, since the user performs operation for advancing the color measuring process to the next color measuring process, the color measurement for the next color fifth in order is performed as shown in D27.

Figure 13:
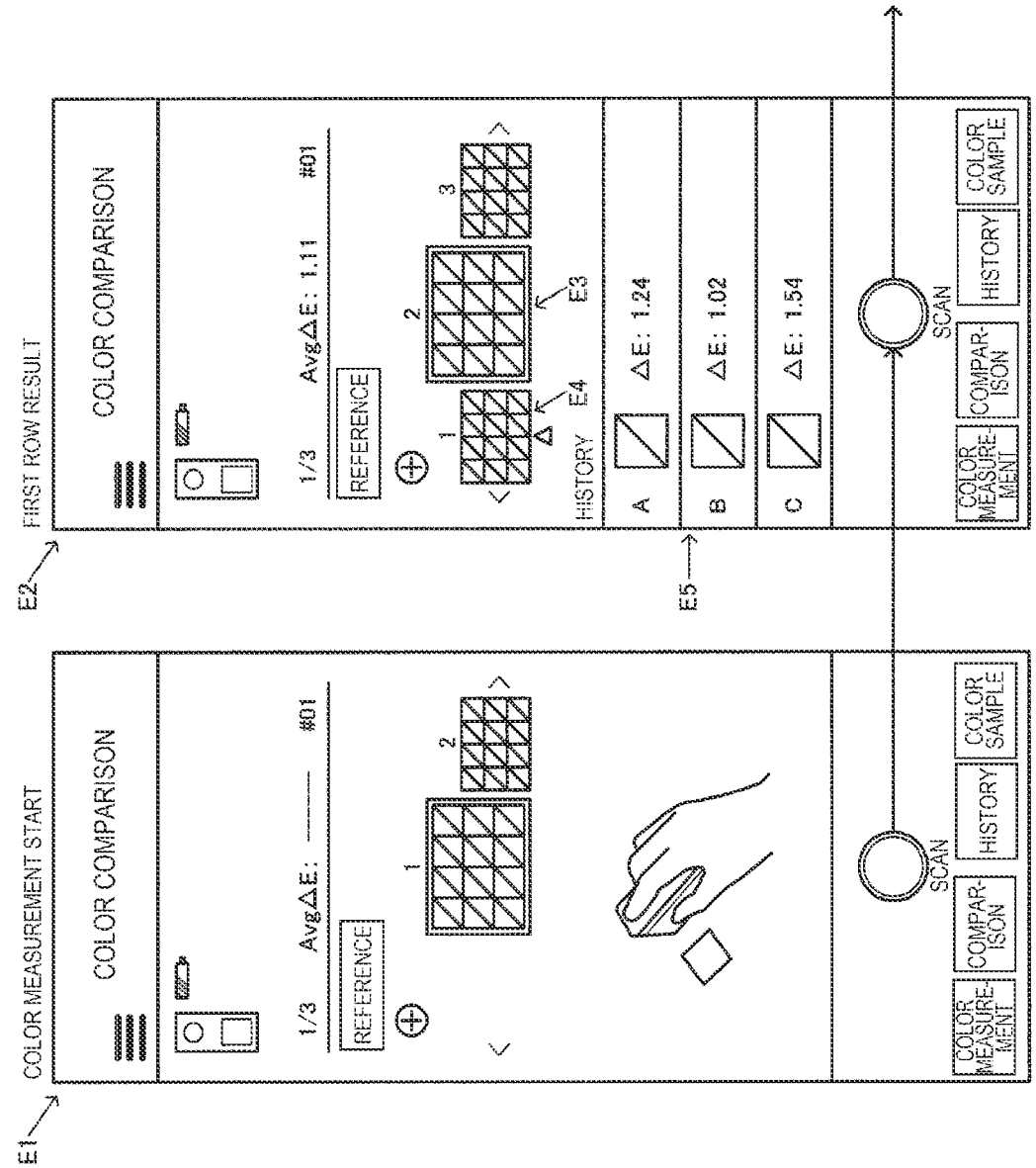
FIG. 13 is a screen transition example of the group color measurement by the line color measurement in the terminal device.
Figure 14:
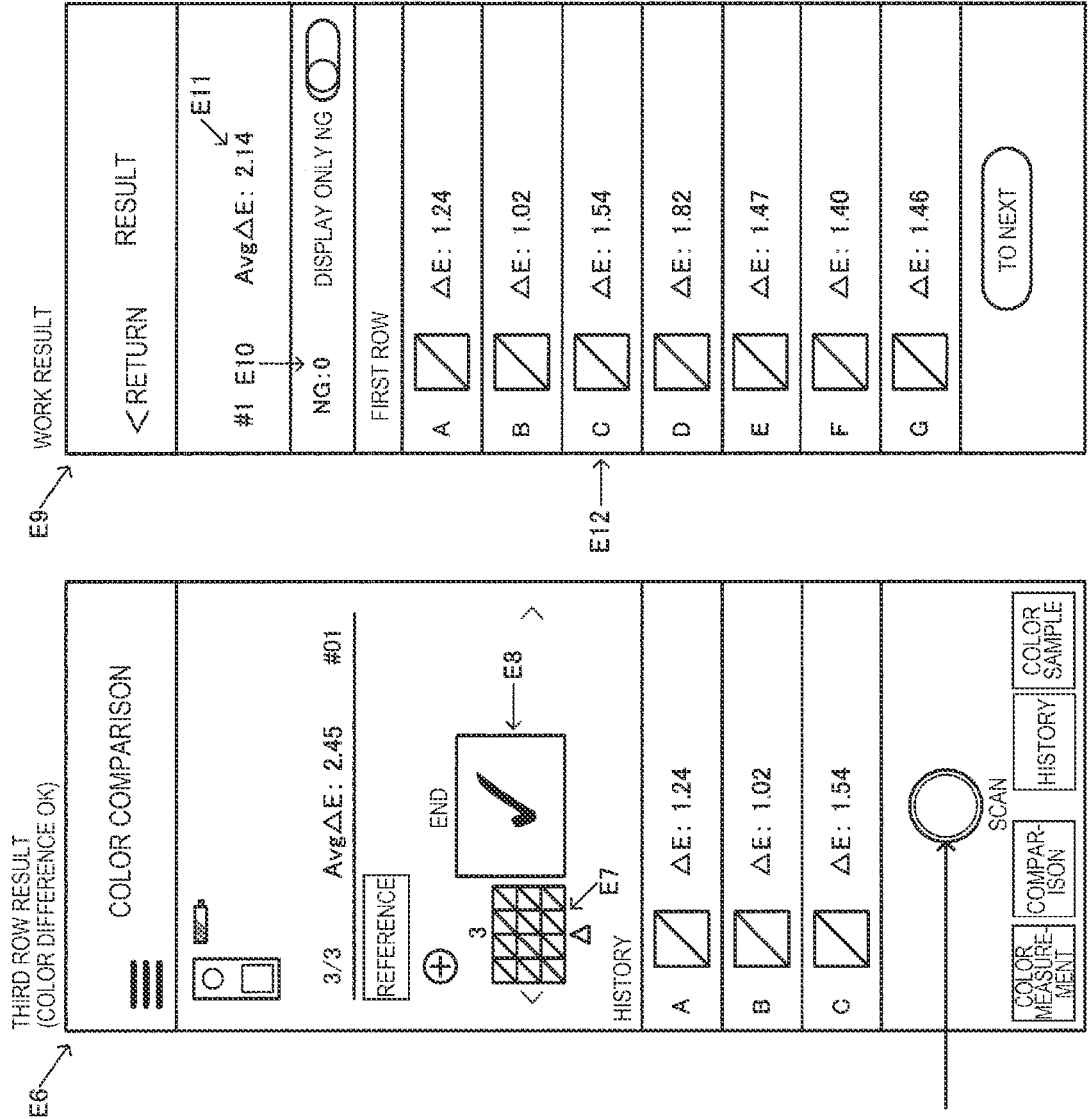
FIG. 14 is a screen transition example of the group color measurement by the line color measurement in the terminal device.
Figure 15:
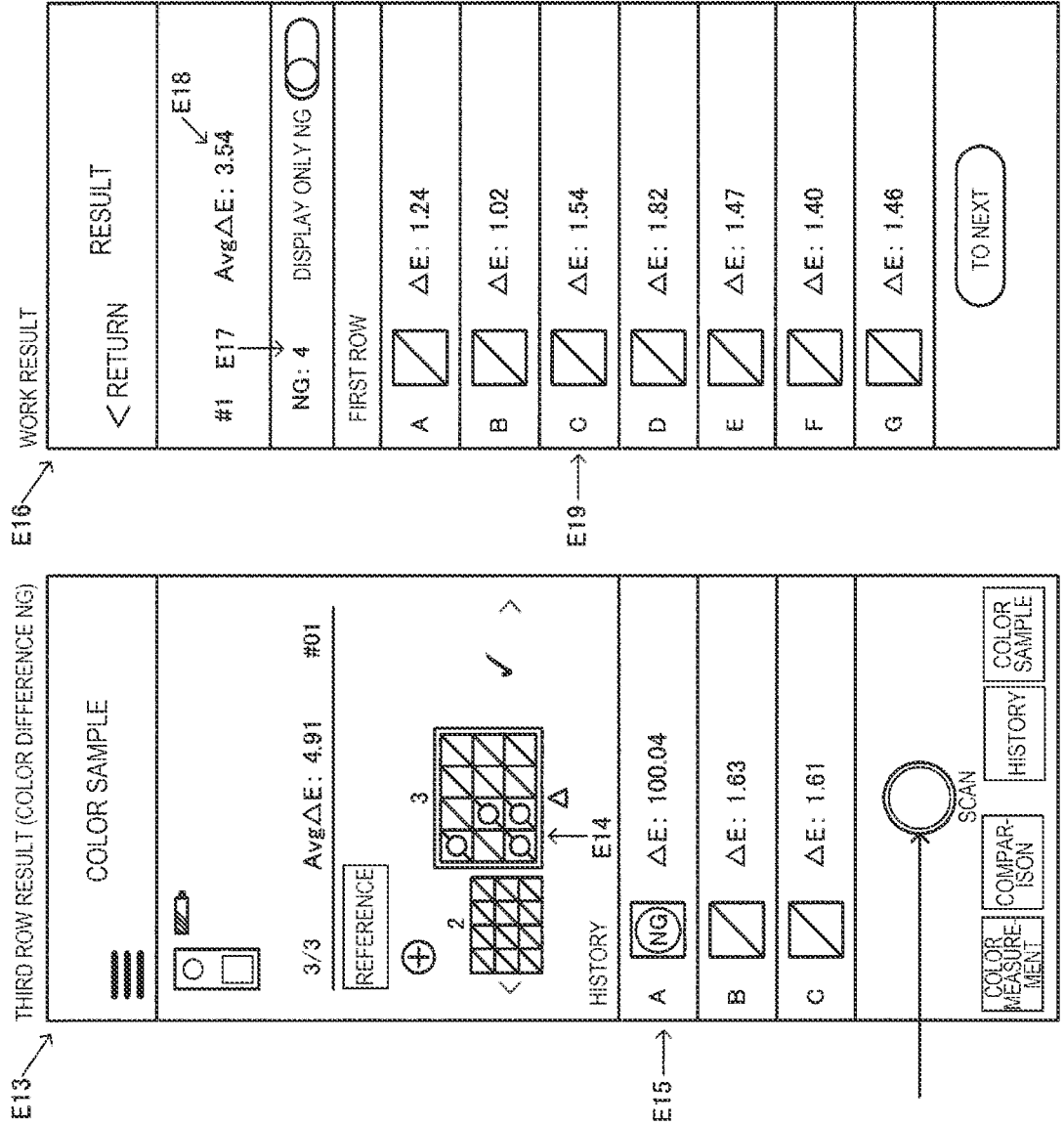
FIG. 15 is a screen transition example of the group color measurement by the line color measurement in the terminal device.

FIGS. 13, 14, and 15 are diagrams showing screen transition examples of the group color measurement by the line color measurement in the terminal device 60. When operation of the color measurement is performed after a screen of a color measurement start in E1 in FIG. 13 is displayed on the display section 68, the color measurement in a first row is performed and a screen of a color measurement result is displayed on the display section 68 as shown in E2. As shown in E3, a first marker having a square shape for identifying a color of a line to be measured next and a schematic color of the color of the line to be measured next are displayed. As shown in E4, a second marker of a triangle arrow for identifying a color of a line measured this time and a schematic color of the color of the line measured this time are displayed. As shown in E5, each of the measured colors is also displayed.

On a screen of E6 in FIG. 14, as shown in E7, it is indicated that the color measurement for a color in the last third row is performed. As shown in E8, display for informing that a color group to be measured next is absent is performed. On a screen of a work result in E9, as shown in E10, it is displayed that the number of cases of NG is zero. As shown in E11, for example, an average of color differences about all the lines is displayed. As shown in E12, the color differences ΔE and schematic colors about the colors in the rows are displayed.

On a screen in E13 in FIG. 15, as shown in E14, it is displayed that colors of four cases of NG are present in the third row. In this case, a color measuring process for measuring a color of the present third row is continued. The color to be measured next is the color in the present third row until the user performs operation for advancing the color measuring process to the next color measuring process for the next row. A screen of a work result in E16 is a screen for displaying all results of the color measurement. As shown in E17, it is displayed that the number of cases of NG is four among thirty-six colors in the three rows. As shown in E18, for example, an average of color differences about all the thirty-six colors is displayed. As shown in E19, a history of the measured colors is also displayed.

3. Processing in this Embodiment

Figure 16:
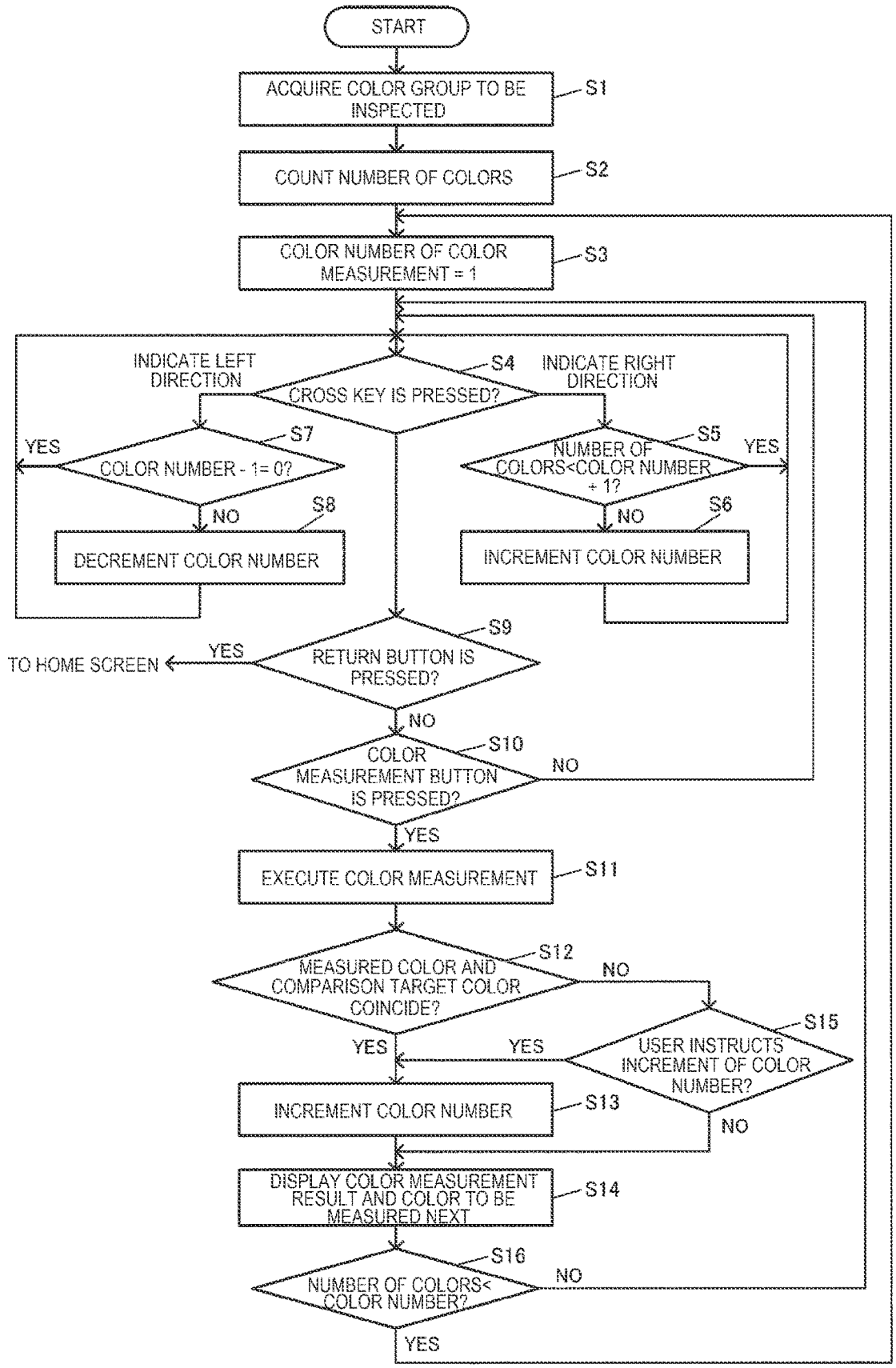
FIG. 16 is a flowchart for explaining a processing example in an embodiment.

Processing in this embodiment is explained in detail. FIG. 16 is a flowchart for explaining the processing in this embodiment.

First, the color measuring system 10 acquires a color group to be inspected (step S1). Specifically, the receiving section 14 receives selection by the user out of a plurality of color groups registered in the storing section in advance. The control section 18 selects and acquires one color group according to the selection. The color measuring system 10 counts the number of colors in the color group to be inspected (step S2). In the example shown in FIGS. 5 and 6 explained above, the number of colors is five. The color measuring system 10 sets a color number of the color measurement to 1, which is an initial value (step S3).

Subsequently, the color measuring system 10 determines whether the cross key 42 shown in FIG. 2 is pressed (step S4). In this flowchart, virtual keys displayed on a screen may be used instead of the physically present cross key 42 and buttons. When the right direction is indicated by the cross key 42, the color measuring system 10 determines whether a color number+1 is larger than the number of colors (step S5). When the color number+1 is not larger than the number of colors, the color measuring system 10 increments the color number of the color measurement by, for example, one (step S6). On the other hand, when the color number+1 is larger than the number of colors, the color measuring system 10 returns to the processing in step S4. When the left direction is indicated by the cross key 42, the color measuring system 10 determines whether the color number−1 is 0 (step S7). When the color number−1 is not 0, the color measuring system 10 decrements the color number of the color measurement by, for example, one (step S8). On the other hand, when the color number−1 is 0, the color measuring system 10 returns to the processing in step S4. The determination of the indication of the right direction in step S4 may be determination of indication of the upward direction. The determination of the indication of the left direction may be determination of indication of the downward direction.

Subsequently, when the cross key 42 is not pressed, the color measuring system 10 determines whether the return button 44 shown in FIG. 2 is pressed (step S9). When the return button 44 is pressed, the color measuring system 10 shifts a screen displayed on the display section 38 or the display section 68 to a home screen. On the other hand, when the return button 44 is not pressed, the color measuring system 10 determines whether the color measurement button 40 is pressed (step S10). When the color measurement button 40 is pressed, the color measuring system 10 executes the color measurement (step S11). When the color measurement button 40 is not pressed, the color measuring system 10 returns to the processing in step S4.

After executing the color measurement using the color measuring section 12, the color measuring system 10 determines whether a measured color and a comparison target color coincide (step S12). That is, when a color difference between the measured color and the comparison target color does not exceed a value decided by a permissive condition, the color measuring system 10 determines that the colors coincide. When the color difference exceeds the value, the color measuring system 10 determines that the colors do not coincide. When the colors coincide, the color measuring system 10 increments a color number of the color measurement by, for example, one (step S13) and displays a color measurement result and a color to be measured next (step S14). On the other hand, when the colors do not coincide, the color measuring system 10 determines whether the user has performed operation for instructing increment of the color number (step S15). When the operation for instructing increment of the color number is performed, the color measuring system 10 increments the color number of the color measurement by, for example, one (step S13) and displays the color measurement result and the color to be measured next (step S14). On the other hand, when the operation for instructing increment of the color number is not performed, the color measuring system 10 displays the color measurement result and the color to be measured next without incrementing the color number (step S14). The color measuring system 10 determines whether the color number of the color measurement exceeds the number of colors (step S16). When the color number of the color measurement does not exceed the number of colors, the color measuring system 10 returns to the processing in step S4. When the color number of the color measurement exceeds the number of colors, the color measuring system 10 returns to the processing in step S3 and sets the color number to 1, which is an initial value.

Figure 17:
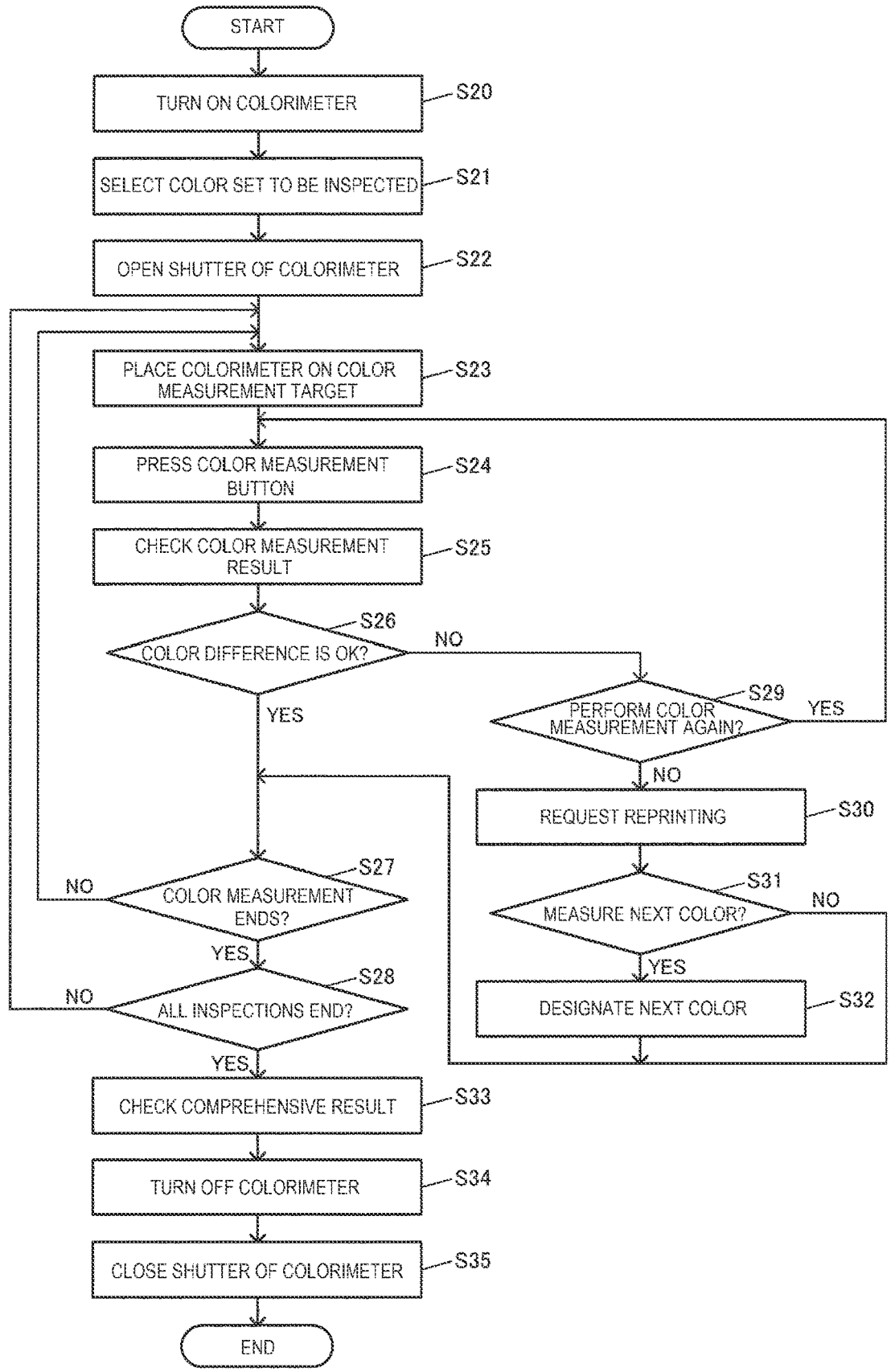
FIG. 17 is a flowchart for explaining a work flow of a user.

FIG. 17 is a flowchart for explaining a work flow of the user. A measurement target, which is an inspection object, is a shirt shown in FIG. 18. A group of five colors C1, C2, C3, C4, and C5 provided in the shirt is a color group to be a target of the group color measurement. In the measurement target, a part or an entire patch of the measurement target may be provided in, for example, a region not used when the measurement target is manufactured as a product. For example, when print dying is performed on cloth, a patch is printed in a test region for performing inspection. The color measurement is performed on the patch using the colorimeter 30. When the cloth is cut to manufacture a product, a place of the test region is discarded by the cutting.

Figure 18:
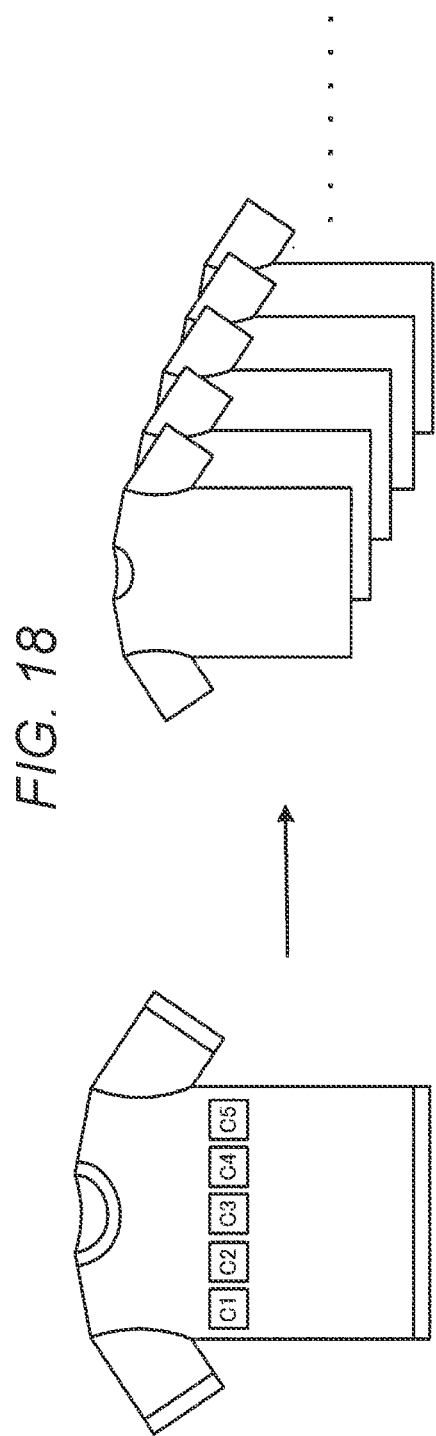
FIG. 18 is an explanatory diagram of a color measurement target.

In the flowchart of FIG. 17, first, the user presses the power button 46 shown in FIG. 2 and turns on the colorimeter 30 (step S20). Subsequently, the user selects a color set to be inspected (step S21) and opens the shutter 48 of the colorimeter 30 (step S22). For example, the user selects a set of the colors C1 to C5 shown in FIG. 18. Subsequently, the user places the colorimeter 30 on the shirt, which is the color measurement target, (step S23) and presses the color measurement button 40 (step S24). The user checks a color measurement result (step S25) and determines whether a color difference is OK (step S26). Referring to FIG. 5 as an example, the user checks the display of OK shown in A11 and A18 to determine whether the color difference is OK. The user determines whether the color measurement ends (step S27). Referring to FIG. 18 as an example, the user determines whether the color measurement for all the colors C1 to C5 in the color group about the shirt, which is the measurement target, ends. The user can determine, by checking the notification information for informing the completion of the work of the color measurement shown in A26 and A28 in FIG. 6, whether the color measurement is completed about the measurement target. When the color measurement for the measurement target does not end, the user returns to the work in step S23 and places the colorimeter 30 in the position of the next color on the measurement target. On the other hand, when the color measurement for the measurement target ends, the user determines whether all of inspections end (step S28). When not all of the inspections end, the user returns to the work in step S23 and places the colorimeter 30 on the next measurement target.

On the other hand, when determining in step S26 that the color difference is not OK, the user determines whether to perform the color measurement again (step S29). When performing the color measurement again, the user returns to the work in step S24 and presses the color measurement button 40 again. When not performing the color measurement again, the user requests reprinting according to necessity (step S30). The user determines whether to measure the next color. When measuring the next color, the user designates the next color (step S31) and shifts to the work in step S27.

When determining in step S28 that all of the inspections end, the user checks a comprehensive result (step S33), turns off the colorimeter 30 (step S34), and closes the shutter 48 of the colorimeter 30 (step S35).

As explained above, in this embodiment, the receiving section 14 receives the designation of the color group including the plurality of colors. The determining section 16 determines whether the color measured by the color measuring section 12 and the comparison target color in the color group coincide. As explained above, the receiving section 14, the determining section 16, the control section 18, and the display processing section 19 shown in FIG. 1 are realized by the processing section 32 and the processing section 62 shown in FIG. 4. For example, when the user selects a color set of the color group in step S22 in FIG. 17, as shown in steps S1 and S2 in FIG. 16, the receiving section 14 receives designation of the color group and specifies the colors and the number of colors in the color group. For example, the receiving section 14 registers the designated color group in correlation with the user as a color group for which the user performs the color measurement. As shown in steps S11 and S12 in FIG. 16, when operation of the color measurement is performed by the user, the determining section 16 determines whether the measured color and the comparison target color in the color group coincide. A color to be measured and a color to be a comparison target are managed by color numbers set in steps S3, S6, S8, and the like in FIG. 16. The determining section 16 calculates a color difference between the measured color and the comparison target color and determines whether the color difference exceeds the permissible value to determine whether the measured color and the comparison target color coincide.

When it is determined by the determining section 16 that the measured color and the comparison target color coincide, the control section 18 performs processing for automatically advancing the color measuring process to the next color measuring process for performing the color measurement for the next color in the color group. For example, when determining in step S12 in FIG. 16 that the color difference between the measured color and the comparison target color does not exceed the permissible value and the determination result of the color difference is OK, the control section 18 increments the color number of the color measurement and advances the color measuring process to the next color measuring process for performing the color measurement for the next color. For example, the color measuring process is managed by the color number of the color measurement. The progress of the color measuring process is managed using the color number. In step S12 in FIG. 16, the user does not perform the operation for advancing the color measuring process to the next color measurement for the next color and the control section 18 performs processing for incrementing the color number. Consequently, the color measuring process proceeds to the next color measuring process for performing the color measurement for the next color. In this way, when it is determined that the measured color and the comparison target color coincide, even if the user does not perform the operation for advancing the color measuring process to the next color measurement for the next color, the color measuring process is automatically advanced to the next color measuring process for performing the color measurement for the next color by the color measuring system 10. Therefore, the operation of the user can be simplified. Smoothing of the work of the color measurement can be achieved. Referring to FIGS. 5 and 6 as an example, for example, when the determination result of the color difference of the color first in order is OK as shown in A11 in FIG. 5, the color measuring process proceeds to the next color measuring process for the next color second in order. As shown in A4, A5, and A6, the identification information and the schematic color of the color to be measured next are displayed in the center of the screen. Therefore, the user confirming that the color difference is OK performs the operation of the color measurement as shown in A13. Therefore, the color measurement for the next color can be performed as shown in A14.

In this embodiment, when it is determined that the measured color and the comparison target color do not coincide, the control section 18 automatically continues the color measuring process for measuring the present color. For example, when it is determined in step S12 in FIG. 16 that the measured color and the comparison target color do not coincide and the determination result of the color difference is NG, the increment processing for the color number in step S13 is not performed and the color measuring process for measuring the present color, which is a color of this time, is continued. For example, when it is determined on the screen in A31 in FIG. 6 that the determination result of the color difference of the color fourth in order is NG as shown in A32, as shown in A33, it is informed to the user that the color to be measured next is the color fourth in order, which is the present color. The color measuring process for measuring the present color is continued. That is, on the screen in A21 in FIG. 6, since it is determined that the determination result of the color difference of the color fourth in order is OK as shown in A22, as shown in A23, the control section 18 informs the user that the color to be measured next is the next color fifth in order. The user can automatically advance the color measuring process to the next color measuring process for the next color with less operation. However, when the determination result of the color difference is NG as shown in A32, the color measuring process for the present color is continued. In this way, when the measured color and the comparison target color do not coincide, the control section 18 does not advance the color measuring process to the next color measuring process for the next color. The color measuring process for the present color is continued.

Therefore, for example, when the user performs the operation of the color measurement, as shown in A34 in FIG. 6, the color measurement for the present color, the determination result of the color difference of which is NG, is performed again. Therefore, even if the user does not instruct the color measuring system 10 to perform the color measurement for the present color again, the user can perform the color measurement for the present color again. The operation of the user can be simplified. Smoothing of the work of the color measurement can be achieved.

In this embodiment, when it is determined by the determining section 16 that the measured color and the comparison target color do not coincide and when the user operation for advancing the color measuring process to the next color measuring process for the next color is performed, the control section 18 advances the color measuring process to the next color measuring process for performing the color measurement for the next color. For example, when it is determined in step S12 in FIG. 16 that the measured color and the comparison target color do not coincide, as shown in step S15, it is determined whether the user operation for advancing the color measuring process to the next color measuring process for the next color is performed. When the user operation for advancing the color measuring process to the next color measuring process for the next color is performed, the processing shifts to step S13, the color number is incremented, and the color measuring process proceeds to the next color measuring process for the next color. For example, on the screen in A31 in FIG. 6, the determination result of the color difference is determined as NG about the color fourth in order as shown in A32 and the user operation for advancing the color measuring process to the next color measuring process for the next color is not performed. Therefore, as shown in A34 and A36, the color measuring process for the present color is continued. On the other hand, on the screen in A34, the determination result of the color difference is determined as NG about the color fourth in order as shown in A35. However, as shown in A37, the right direction is indicated by the cross key 42. The user operation for advancing the color measuring process to the next color measuring process for the next color is performed. Therefore, as shown in A38, the color measuring process proceeds to the next color measuring process for the color fifth in order, which is the next color. In this way, even when it is determined that the measured color and the comparison target color do not coincide, when the user indicates an intention to perform the user operation for advancing the color measuring process to the next color measuring process for the next color, the color measuring process for the present color is not continued and the color measuring process proceeds to the next color measuring process. Therefore, while simplifying the operation of the user and achieving smoothing of the work of the color measurement, it is possible to reflect the indication of the intention of the user to advance the color measuring process to the next color measuring process. In printing on cloth or the like by print dying or the like, although a measured color and a comparison target color originally coincide, because of unevenness on the surface of the cloth or an environment such as a light source, it is sometimes determined that the measured color and the comparison target color do not coincide. Even in such a case, when it is determined that the colors do not coincide, the user sometimes performs the operation for instructing the color measurement for the next color.

In this embodiment, when it is determined that the last color in the color group coincides with the measured color, the control section 18 automatically advances the color measuring process to the next color measuring process for performing the color measurement for the first color in the color group. For example, when it is determined that the last color in the color group coincides with the measured color and it is determined in step S16 in FIG. 16 that the color number is larger than the number of colors, the processing shifts to step S3 and the color number is set to 1, which is the initial value. Consequently, the color measuring process proceeds to the next color measuring process for performing the color measurement for the first color in the color group. The color measurement for the color first in order in the color group is performed. Therefore, for example, the user informed of the completion of the work of the color measurement by the marker shown in A28 in FIG. 6 can place the colorimeter 30 on the next color measurement target such as a shirt and start the color measurement from the color first in order. In this way, for example, when the color measurement for the color group is performed about each of a plurality of color measurement targets, when the color measurement for the color group about one color measurement target is completed, the user can place the colorimeter 30 on the next color measurement target and perform the work of the color measurement from the color first in order in the color group. Therefore, the operation of the user can be further simplified. Further smoothing of the work of color measurement can be realized. As shown in step S9 in FIG. 16, when the user presses the return button 44 shown in FIG. 2, the screen shifts to the home screen. Therefore, the user is capable of leaving a processing loop of the color measurement for the color group shown in FIG. 16 by pressing the return button 44.

Figure 19:
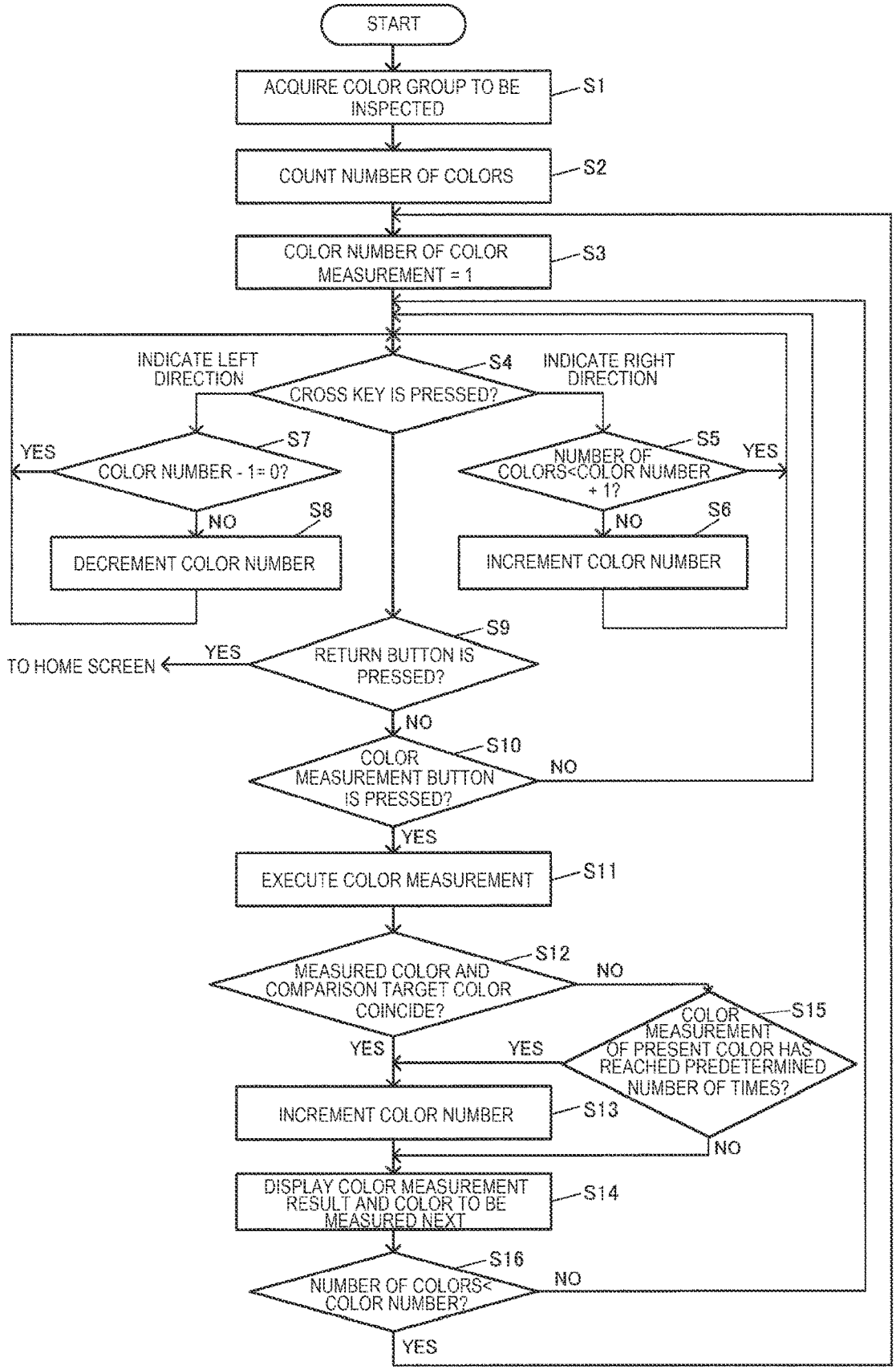
FIG. 19 is a flowchart for explaining another processing example in the embodiment.

When the measured color and the comparison target color do not coincide and, even if the color measurement for the present color is repeated a predetermined number of times, the measured color does not coincide with the comparison target color, the control section 18 may automatically advance the color measuring process to the next color measuring process for performing the color measurement for the next color in the color group. FIG. 19 is a flowchart showing a processing example in this embodiment in this case. FIG. 19 is different from FIG. 16 in the processing in step S15. In FIG. 19, when it is determined by the control section 18 that the measured color and the comparison target color do not coincide, it is determined NO in step S12. As shown in step S15, it is determined by the control section 18 whether the color measurement for the present color has reached the predetermined number of times. When it is determined by the control section 18 that the color measurement for the present color has not reached the predetermined number of times, the processing shifts to step S14 and the color measuring process for the present color is continued. On the other hand, when it is determined by the control section 18 that the color measurement for the present color has reached the predetermined number of times, the processing shifts to step S13, the color number is incremented, and the color measuring process proceeds to the next color measuring process for the next color. For example, it is assumed that the predetermined number of times is set to five and, as shown in A31 and A32 in FIG. 6, it is determined that the color fourth in order does not coincide with the comparison target color. In this case, until the determination of the noncoincidence of the colors is performed four times, the processing shifts from step S15 to step S14 in FIG. 19 without the color number being incremented, the color measuring process for the color fourth in order, which is the present color, is continued, and re-color measurement is performed. When it is determined in the fifth re-color measurement that the colors do not coincide, it is determined that the color measurement for the present color has reached the predetermined number of times and the processing shifts from step S15 to step S13. Consequently, the color number is incremented and the color measuring process automatically proceeds to the next color measuring process for the next color. That is, when the measured color and the comparison target color do not coincide and, even if the color measurement for the present color is repeated five times, which is the predetermined number of times, the measured color does not coincide with the comparison target color, the color measuring process automatically proceeds to the next color measuring process for performing the color measurement for the next color in the color group. In this way, when a determination result is not OK even if the color measurement is repeatedly performed about a certain color in the color group, it is possible to skip the color measurement for this color and shift to the color measuring process for the next color. Therefore, when the re-color measurement is repeated the predetermined number of times, the color measurement about the color is automatically skipped. The user can perform measurement of the next color. Therefore, convenience of the user is improved.

Figure 20:
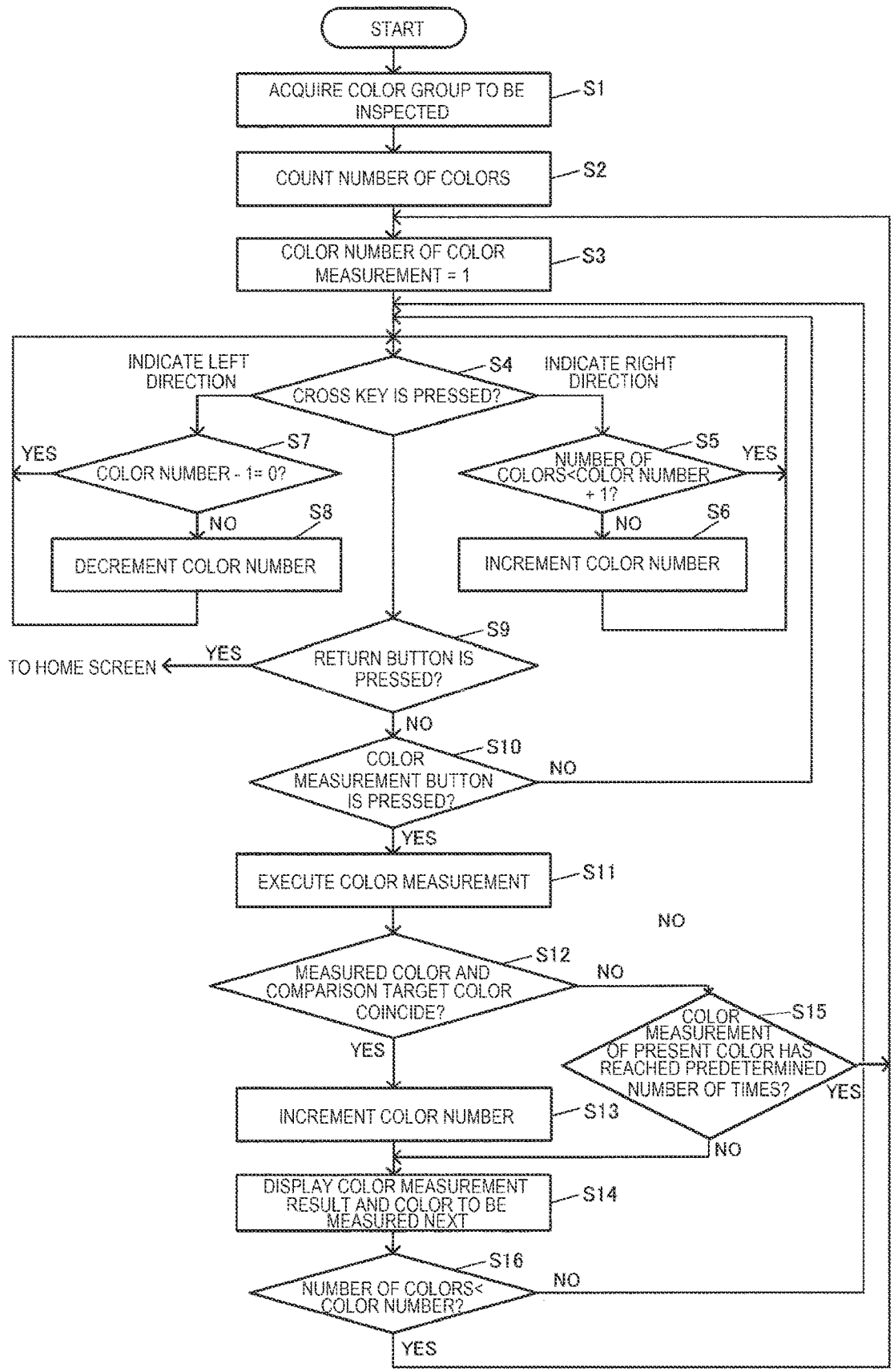
FIG. 20 is a flowchart for explaining another processing example in the embodiment.

In this embodiment, when the measured color and the comparison target color do not coincide even if the color measurement for the present color is repeated the predetermined number of times, the control section 18 may automatically advance the color measuring process to the next color measuring process for performing the color measurement for the first color in the color group. FIG. 20 is a flowchart showing a processing example in this embodiment in this case. FIG. 20 is different from FIG. 16 in the processing in step S15. In FIG. 20, when it is determined by the control section 18 that the measured color and the comparison target color do not coincide, it is determined NO in step S12. As shown in step S15, it is determined by the control section 18 whether the color measurement for the present color has reached the predetermined number of times. When it is determined by the control section 18 that the color measurement for the present color has not reached the predetermined number of times, the processing shifts to step S14 and the color measuring process for the present color is continued. On the other hand, when it is determined that the color measurement for the present color has reached the predetermined number of times, the processing shifts to step S3, the color number is set to 1, which is the initial value, and the color measuring process proceeds to the next color measuring process for performing the color measurement for the first color in the color group. For example, it is assumed that the predetermined number of times is set to five and, as shown in A31 and A32 in FIG. 6, it is determined that the color fourth in order does not coincide with the comparison target color. In this case, until the determination of the noncoincidence of the colors is performed four times, the processing shifts from step S15 to step S14 in FIG. 20 without the color number being incremented, the color measuring process for the color fourth in order, which is the present color, is continued, and re-color measurement is performed. When it is determined in the fifth re-color measurement that the colors do not coincide, it is determined that the color measurement for the present color has reached the predetermined number of times and the processing shifts from step S15 to step S3. Consequently, the color number is set to one and the color measuring process automatically proceeds to the next color measuring process for the first color in the color group. That is, when the measured color and the comparison target color do not coincide and, even if the color measurement for the present color is repeated five times, which is the predetermined number of times, the measured color does not coincide with the comparison target color, the color measuring process automatically proceeds to the next color measuring process for performing the color measurement for the first color in the color group. In this way, when a determination result is not OK even if the color measurement is repeatedly performed about a certain measurement target color in the color group, it is possible to skip the color measurement for the measurement target and shift to the color measuring process for the next measurement target. Therefore, when the re-color measurement is repeated the predetermined number of times, the color measurement about the measurement target is automatically skipped. The user can perform measurement of the next measurement target. Therefore, convenience of the user can be improved.

In this embodiment, the permissive condition about coincidence of colors is set for the color group. The determining section 16 determines, based on the set permissive condition, whether a measured color and a comparison target color coincide. For example, when a permissible value of a color difference is set as the permissive condition, the determining section 16 determines whether a color difference between the measured color and the comparison target color exceeds the permissible value to determine whether the measured color and the comparison target color coincide. In this way, it is possible to set various permissive conditions as conditions for the coincidence of the measured color and the measurement target color and determine whether the measured color and the measurement target color coincide. Therefore, for example, it is possible to perform, according to an appropriate permissive condition corresponding to the color group, whether the measured color and the comparison target color coincide. It is possible to realize proper comparison determination processing.

For example, FIG. 21 is an explanatory diagram about various settings in the color measuring system 10. On a setting screen shown in FIG. 21, the user can perform favorite setting desired by the user. For example, about setting of the color measurement, an M factor and the number of times of the color measurement can be set. About setting of color calculation, an observation light source, a color difference formula, and a color difference threshold can be set and a color profile can also be set. In this way, in FIG. 21, permissive conditions such as the color difference threshold, which is a permissible value of a color difference, the color difference formula, which is a calculation formula of the color difference, and the observation light source can be set. Calculation formulas for the color difference that the user can designate include $\Delta E2000$, $\Delta E1994$ (graphic art), $\Delta E1994$ (textile), and $\Delta E1976$. For example, $\Delta E1976$ is called CIE76, is a color difference formula defined in 1976, and is defined as an Euclidian distance in an Lab color space, which is a CIE LAB color space. The Lab color space is a color space in which a color is represented by a coordinate on an equal color space consisting of brightness L and chromaticness indexes "a" and "b". However, the color difference $\Delta E$ and evaluation by human eyes are different depending on a color. This is because the shape of a color discrimination region of the human eyes has perceptual nonuniformity unlike a range of an allowable color difference in the Lab color space. $\Delta E1994$ called CIE94 is expanded to be adapted to the perceptual nonuniformity while using the Lab color space. Specifically, in $\Delta E1994$, a weighting coefficient for a specific use is introduced. Values of the weighting coefficient are different in $\Delta E1994$ (graphic art) and ΔE1994 (textile). ΔE2000 called CIEDE2000 defines a calculation formula such that a color difference based on calculation is approximate to the color discrimination region of the human eyes on the Lab color space. Specifically, weighting is performed by a weight value coefficient based on a brightness difference, a chroma difference, and a hue difference. The weight value coefficient takes into account the influence of brightness, chroma, and a hue angle. In the calculation formula, chroma dependency, hue dependency, and brightness dependency, which are characteristics of the color discrimination region of the human eyes on the Lab color space, are considered.

As explained above, this embodiment relates to a color measuring system including: a color measuring section configured to perform color measurement; a receiving section configured to receive designation of a color group including a plurality of colors; a determining section configured to determine whether a color measured by the color measuring section and a comparison target color in the color group coincide; and a control section configured to, when it is determined that the measured color and the comparison target color coincide, automatically advance a color measuring process to a next color measuring process for performing the color measurement for a next color in the color group.

According to this embodiment, when it is determined that the measured color and the comparison target color coincide, for example, even if a user does not perform operation for advancing the color measuring process to the next color measurement for the next color, the color measuring process automatically proceeds to the next color measuring process for performing the color measurement for the next color. Therefore, the operation of the user can be simplified. Smoothing of the work of the color measurement can be achieved.

In this embodiment, when it is determined that the measured color and the comparison target color do not coincide, the control section may automatically continue a color measuring process for performing the color measurement for a present color.

In this way, when the measured color and the comparison target color do not coincide, the color measuring process does not proceed to the next color measuring process for the next color and the color measuring process for the present color is continued. Therefore, even if the user does not instruct the color measuring system to perform the color measurement for the present color again, the user can perform the color measurement for the present color again. The operation of the user can be simplified. Smoothing of the work of the color measurement can be achieved.

In this embodiment, when it is determined that the measured color and the comparison target color do not coincide and user operation for advancing the color measuring process to the next color measuring process for the next color is performed, the control section may advance the color measuring process to the next color measuring process for performing the color measurement for the next color.

In this way, even when it is determined that the measured color and the comparison target color do not coincide, when the user indicates an intention to perform operation for advancing the color measuring process to the next color measuring process for the next color, the color measuring process for the present color is not continued and the color measuring process proceeds to the next color measuring process. Therefore, while simplifying the operation of the user and achieving smoothing of the work of the color measurement, it is possible to reflect the indication of the intention of the user to advance the color measuring process to the next color measuring process.

In this embodiment, when it is determined that the a last comparison target color in the color group coincides with the measured color, the control section may automatically advance the color measuring process to a next color measuring process for performing the color measurement for a first comparison target color in the color group.

In this way, when the color measurement for the color group is performed about, for example, each of a plurality of measurement targets, when the color measurement for the color group about one color measurement target is completed, the user can perform, about the next color measurement target, the work of the color measurement from a color first in order in the color group.

In this embodiment, when it is determined that the measured color and the comparison target color do not coincide and, even if the color measurement for a present color is repeated a predetermined number of times, the measured color does not coincide with the comparison target color, the control section may automatically advance the color measuring process to the next color measuring process for performing the color measurement for the next color in the color group.

In this way, when re-color measurement about the present color is repeated the predetermined times, the color measurement about the color is automatically skipped and the user can perform the color measurement for the next color. Therefore, convenience of the user can be improved.

In this embodiment, when it is determined that the measured color and the comparison target color do not coincide and, even if the color measurement for a present color is repeated a predetermined number of times, the measured color does not coincide with the comparison target color, the control section may automatically advance the color measuring process to a next color measuring process for performing the color measurement for a first color in the color group.

In this way, when re-color measurement is repeated the predetermined times about the present color, the color measurement about the measurement target is automatically skipped and the user can perform the measurement of the next measurement target. Therefore, convenience of the user can be improved.

In this embodiment, a permissive condition for coincidence of colors may be set for the color group, and the determining section may determine, based on the permissive condition, whether the measured color and the comparison target color coincide.

In this way, it is possible to set various permissive conditions as a condition for coincidence of the measured color and the measurement target color and determine whether the measured color and the measurement target color coincide.

In this embodiment, the color measuring system may further include a display processing section configured to display at least one of identification information of a comparison target color of a color to be measured next and a schematic color of the comparison target color of the color to be measured next.

In this way, the user can identify which color the color to be measured next is and in which order in the color group the color to be measured next is and learn what kind of a schematic color the color to be measured next is. It is possible to smoothly perform the work of the color measurement.

In this embodiment, the display processing section may display at least one of identification information of a color measured this time and a schematic color of the color measured this time.

In this way, the user can identify which color the color measured this time is and in which order in the color group the color measured this time is and learn what kind of a schematic color the color measured this time is. Smoothing of the work of the color measurement for the color group can be achieved.

In this embodiment, the display processing section may display notification information for informing completion of the work of the color measurement.

In this way, by viewing the notification information for informing the completion of the work of the color measurement, the user can visually confirm that the work of the color measurement about the color group is completed. Smoothing of the work of the color measurement for the color group can be achieved.

This embodiment relates to a program for causing a computer, which communicates with a color measuring section, to function as: a receiving section configured to receive designation of a color group including a plurality of colors; a determining section configured to determine whether a color measured by the color measuring section and a comparison target color in the color group coincide; and a control section configured to, when it is determined that the measured color and the comparison target color coincide, automatically advance a color measuring process to a next color measuring process for performing the color measurement for a next color in the color group.

According to this embodiment, when it is determined that the measured color and the comparison target color coincide, for example, even if a user does not perform operation for advancing the color measuring process to the next color measurement for the next color, the color measuring process automatically proceeds to the next color measuring process for performing the color measurement for the next color. Therefore, operation of the user can be simplified. Smoothing of the work of the color measurement can be achieved.

This embodiment is explained in detail above. It would be easily understood by those skilled in the art that many modifications not substantially departing from the new matters and the effects of this embodiment are possible. Therefore, all of such modifications are deemed to be included in the scope of the present disclosure. For example, terms described together with broader or synonymous different terms at least once in the specification or the drawings can be replaced with the different terms in any parts of the specification and the drawings. All combinations of this embodiment and the modifications are also included in the scope of the present disclosure. The configurations, the operations, and the like of the color measuring system, the colorimeter, the terminal device, and the like, a color measuring method, a method of producing a target object such as a print or dyed cloth through color measurement, and the like are not limited to those explained in this embodiment and various modified implementations are possible. Entities and functions of the operations explained in this embodiment may be included in an integral device or may be included in a plurality of devices that distributedly execute the operations. For example, all of the functions of the colorimeter 30 and the terminal device 60 explained in this embodiment may be included in the colorimeter 30. For example, the colorimeter 30 may include only a color measuring function and the terminal device 60 may include all of the other functions.

For example, the colorimeter 30 may include other input means such as a touch panel display and a microphone and may not include a cross key. The colorimeter 30 may not include a display. In this case, the colorimeter 30 may perform notification by sound or may project a large screen to the outside. The notification is operated by the terminal device 60 and cannot be operated by the colorimeter 30. Naturally, the notification by sound and the projection to the outside and display on the display included in the colorimeter 30 may be combined.

The permissive condition serving as a reference for determining coincidence and noncoincidence of colors may be registered in the colorimeter 30 itself. Only one permissive condition may be registered in association with the entire color group. The permissive condition may be registered in association with each of individual colors in the color group. When a plurality of registrations among these registrations are performed, it is desirable to preferentially use a latter one. The permissive condition may be selectable by the user before the color measurement or may be fixed.

The colorimeter 30 performs the color measurement in response to the pressing of the color measurement button 40 included in the colorimeter 30. However, the colorimeter 30 may perform the color measurement according to another trigger instead or in addition to the pressing of the color measurement button 40. For example, the colorimeter 30 may perform the color measurement according to an instruction by voice from the user or may perform the color measurement according to an instruction from the terminal device 60. Further, the colorimeter 30 may detect that the colorimeter 30 is pressed against a target object and perform the color measurement. Alternatively, the colorimeter 30 may always repeat the color measurement until a predetermined limit time and, when a color coinciding with a reference color is measured, regard the color as a color measurement target and, when a color coinciding with the reference color is not measured by the limit time, regard a color closest to the reference color among colors measured in the limit time as the color measurement target.

A target of the color measurement is not limited. For example, the color measurement target may be a print, may be dyed cloth, may have a flat shape, or may have a three-dimensionally complicated shape.

What is claimed is:

1. A color measuring system comprising:
a color measurement sensor configured to perform color measurement; and
a digital signal processor
configured to receive designation of a reference color group including a plurality of reference colors,
configured to select a reference color in the reference color group and determine whether a measured color that has been measured by the color measurement sensor and the reference color in the reference color group coincide, and,
in response to determining that the measured color and the reference color coincide, configured to automatically select a next reference color in the reference color group and automatically advance a color measuring process to a next color measuring process for measuring a next color by the color measurement sensor for the next reference color in the reference color group.

2. The color measuring system according to claim 1, wherein, when determining that the measured color and the reference color do not coincide, the digital signal processor automatically continues a color measuring process for performing the color measurement for a present color.

3. The color measuring system according to claim 2, wherein, when determining that the measured color and the reference color do not coincide and when user operation for advancing the color measuring process to the next color measuring process for the next reference color is performed, the digital signal processor advances the color measuring process to the next color measuring process for performing the color measurement for the next reference color.

4. The color measuring system according to claim 1, wherein, when determining that a last reference color in the reference color group coincides with the measured color, the digital signal processor automatically advances the color measuring process to a next color measuring process for performing the color measurement for a first reference color in the reference color group.

5. The color measuring system according to claim 1, wherein, when determining that the measured color and the reference color do not coincide and, even if the color measurement for a present color is repeated a predetermined number of times, the measured color does not coincide with the reference color, the digital signal processor automatically advances the color measuring process to the next color measuring process for performing the color measurement for the next reference color in the reference color group.

6. The color measuring system according to claim 1, wherein, when determining that the measured color and the reference color do not coincide and, even if the color measurement for a present color is repeated a predetermined number of times, the measured color does not coincide with the reference color, the digital signal processor automatically advances the color measuring process to a next color measuring process for performing the color measurement for a first reference color in the reference color group.

7. The color measuring system according to claim 1, wherein
a permissive condition for coincidence of colors is set for the reference color group, and
the digital signal processor determines, based on the permissive condition, whether the measured color and the reference color coincide.

8. The color measuring system according to claim 1, wherein the digital signal processor displays at least one of identification information of a next reference color of a color to be measured next and a schematic color of the next reference color of the color to be measured next.

9. The color measuring system according to claim 8, wherein the digital signal processor displays at least one of identification information of a color measured this time and a schematic color of the color measured this time.

10. The color measuring system according to claim 9, wherein the digital signal processor displays notification information for informing completion of work of the color measurement.

11. The color measuring system according to claim 1, wherein
the color measurement sensor is installed on a handy device that is adapted to be gripped by a user's hand.

12. The color measuring system according to claim 1, wherein
the color measuring system repeats process of performing of color measurement and determining of coincidence between a measured color and a reference color a plurality of times.

13. A non-transitory computer-readable storage medium storing a program for causing a digital signal processor of a computer, which communicates with a color measurement sensor, to function to:
receive designation of a reference color group including a plurality of reference colors,
select a reference color in the reference color group;
determine whether a measured color that has been measured by the color measurement sensor and the reference color in the reference color group coincide; and
in response to determining that the measured color and the reference color coincide, automatically select a next reference color in the reference color group and automatically advance a color measuring process to a next color measuring process for measuring a next color by the color measurement sensor for the next reference color in the reference color group.

14. A producing method using a color measuring system including:
a color measurement sensor configured to perform color measurement; and
a digital signal processor
configured to receive designation of a reference color group including a plurality of reference colors,
configured to select a reference color in the reference color group and determine whether a measured color that has been measured by the color measurement sensor and the reference color in the reference color group coincide, and,
in response to determining that the measured color and the reference color coincide, configured to automatically select a next reference color in the reference color group and automatically advance a color measuring process to a next color measuring process for measuring a next color by the color measurement sensor for the next reference color in the reference color group,
the producing method comprising:
measuring, by the color measurement sensor, a color of a target object;
selecting, by the digital signal processor, the reference color in the reference color group; and
determining, by the digital signal processor, whether the measured color and the reference color coincide, wherein
in response to determining that the measured color and the reference color coincide, the digital signal processor automatically selects the next reference color in the reference color group and automatically repeats the measuring and the determining to thereby complete the target object.

* * * * *